US011048080B2

(12) United States Patent
Miyamoto

(10) Patent No.: US 11,048,080 B2
(45) Date of Patent: Jun. 29, 2021

(54) HEAD-UP DISPLAY

(71) Applicant: Panasonic Intellectual Property Management Co., Ltd., Osaka (JP)

(72) Inventor: Tomoaki Miyamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 216 days.

(21) Appl. No.: 16/514,132

(22) Filed: Jul. 17, 2019

(65) Prior Publication Data

US 2019/0339520 A1 Nov. 7, 2019

Related U.S. Application Data

(63) Continuation of application No. PCT/JP2018/038602, filed on Oct. 17, 2018.

(30) Foreign Application Priority Data

Nov. 7, 2017 (JP) .............................. JP2017-214411

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC .......... G02B 27/0101; G02B 2027/011; G02B 2027/0123; G02B 2027/013; B60K 35/00; B60K 2370/1529; B60K 2370/31
See application file for complete search history.

(56) References Cited

U.S. PATENT DOCUMENTS 5,497,170 A   3/1996 Kato et al.
2013/0094092 A1   4/2013 Imahori et al.
(Continued)

FOREIGN PATENT DOCUMENTS

DE   10 2012 109 569   4/2013
DE   10 2014 013 967   3/2016
(Continued)

OTHER PUBLICATIONS

International Search Report (ISR) dated Nov. 13, 2018 in International (PCT) Application No. PCT/JP2018/038602.
(Continued)

*Primary Examiner* — Ryan D Howard
(74) *Attorney, Agent, or Firm* — Wenderoth, Lind & Ponack, L.L.P.

(57) ABSTRACT

Provided is a head-up display which projects an image on a windshield and forms a virtual image visually recognizable by a viewer. The head-up display includes a display element which displays the image and a projection optical system which guides the image displayed by the display element to the windshield and forms the virtual image. The projection optical system includes at least two mirrors each having a reflective surface with a concave profile. The windshield has a curvature radius Rx in the right-left direction of the windshield which satisfies $0.05 < EBx/Rxmax < 0.50$, where EBx denotes an eye box size in an X direction in which the virtual image is visually recognizable by the viewer, and Rxmax denotes a maximum value of Rx in an effective ray area of the windshield.

19 Claims, 9 Drawing Sheets

(52) U.S. Cl.
CPC ...... *B60K 2370/31* (2019.05); *B60K 2370/68* (2019.05); *G02B 2027/013* (2013.01)

(56) References Cited

U.S. PATENT DOCUMENTS

| | | |
|---|---|---|
| 2016/0116735 A1 | 4/2016 | Hayashi et al. |
| 2016/0193922 A1 | 7/2016 | Kuzuhara |
| 2016/0303974 A1 | 10/2016 | Yonetani et al. |
| 2017/0092169 A1 | 3/2017 | Kuzuhara et al. |
| 2017/0242248 A1 | 8/2017 | Kuzuhara et al. |
| 2017/0248786 A1 | 8/2017 | Kuzuhara et al. |
| 2017/0276937 A1 | 9/2017 | Wunderlich et al. |
| 2018/0149865 A1 | 5/2018 | Arndt et al. |

FOREIGN PATENT DOCUMENTS

| | | |
|---|---|---|
| JP | 4-128816 | 4/1992 |
| JP | 2002-31774 | 1/2002 |
| JP | 2016-136222 | 7/2016 |
| JP | 2017-068251 | 4/2017 |
| WO | 2015/098078 | 7/2015 |
| WO | 2016/038767 | 3/2016 |
| WO | 2016/079926 | 5/2016 |
| WO | 2016/079927 | 5/2016 |
| WO | 2016/198679 | 12/2016 |

OTHER PUBLICATIONS

Extended European Search Report dated Dec. 7, 2020 in corresponding European Patent Application No. 18876949.1.

HEAD-UP DISPLAY

CROSS REFERENCE TO RELATED APPLICATIONS

This application is a U.S. continuation application of PCT International Patent Application Number PCT/JP2018/038602 filed on Oct. 17, 2018, claiming the benefit of priority of Japanese Patent Application Number 2017-214411 filed on Nov. 7, 2017, the entire contents of which are hereby incorporated by reference.

BACKGROUND

1. Technical Field

The present disclosure relates to a head-up display which allows a viewer to visually recognize a display image as a virtual image.

2. Description of the Related Art

International Publication WO2015/098078 discloses a display device including a first reflector whose reflective surface has a convex profile and a second reflector whose reflective surface has a concave profile.

SUMMARY

With a so-called telephoto type display device including a reflector whose reflective surface has a convex profile and a reflector whose reflective surface has a concave profile, when the power (refractive power) of the windshield is high, an increased screen size leads to a difficulty in reducing interference between a ray of light and structural components of a head-up display.

A head-up display according to the present disclosure is a head-up display which projects an image on a windshield and forms a virtual image visually recognizable by a viewer. The head-up display includes a display element which displays the image; and a projection optical system which guides the image displayed by the display element to the windshield and forms the virtual image. The projection optical system includes at least two mirrors each having a reflective surface with a concave profile, and the windshield has a curvature radius Rx in a right-left direction of the windshield which satisfies:

$$0.05 < EBx/Rx\text{max} < 0.50 \tag{1}$$

where EBx denotes an eye box size in an X direction in which the virtual image is visually recognizable by the viewer, and Rxmax denotes a maximum value of the curvature radius Rx in an effective ray area of the windshield, given that an X axis is the right-left direction viewed from the viewer.

According to the present disclosure, a head-up display having a large-sized screen can be provided while reducing interference between a ray of light and structural components of the head-up display.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments will be described in detail with reference to the drawings as necessary. However, unnecessarily detailed description may be omitted. For example, detailed descriptions of well-known aspects or repetitive descriptions of essentially the same configurations may be omitted. This is to avoid unnecessary redundancy and make the following description easier for a person skilled in the art to understand.

Note that the accompanying drawings and the following description are provided not to limit the subject matter recited in the claims but to aid a person skilled in the art to adequately understand the present disclosure.

Embodiment 1

A head-up display according to Embodiment 1 will be described with reference to the drawings.

Note that the specific numerical values related to the head-up display according to Embodiment 1 will be described later in Numerical Examples 1 through 8.

[1. Configuration]

[1.1 Schematic Configuration]

Figure 1:
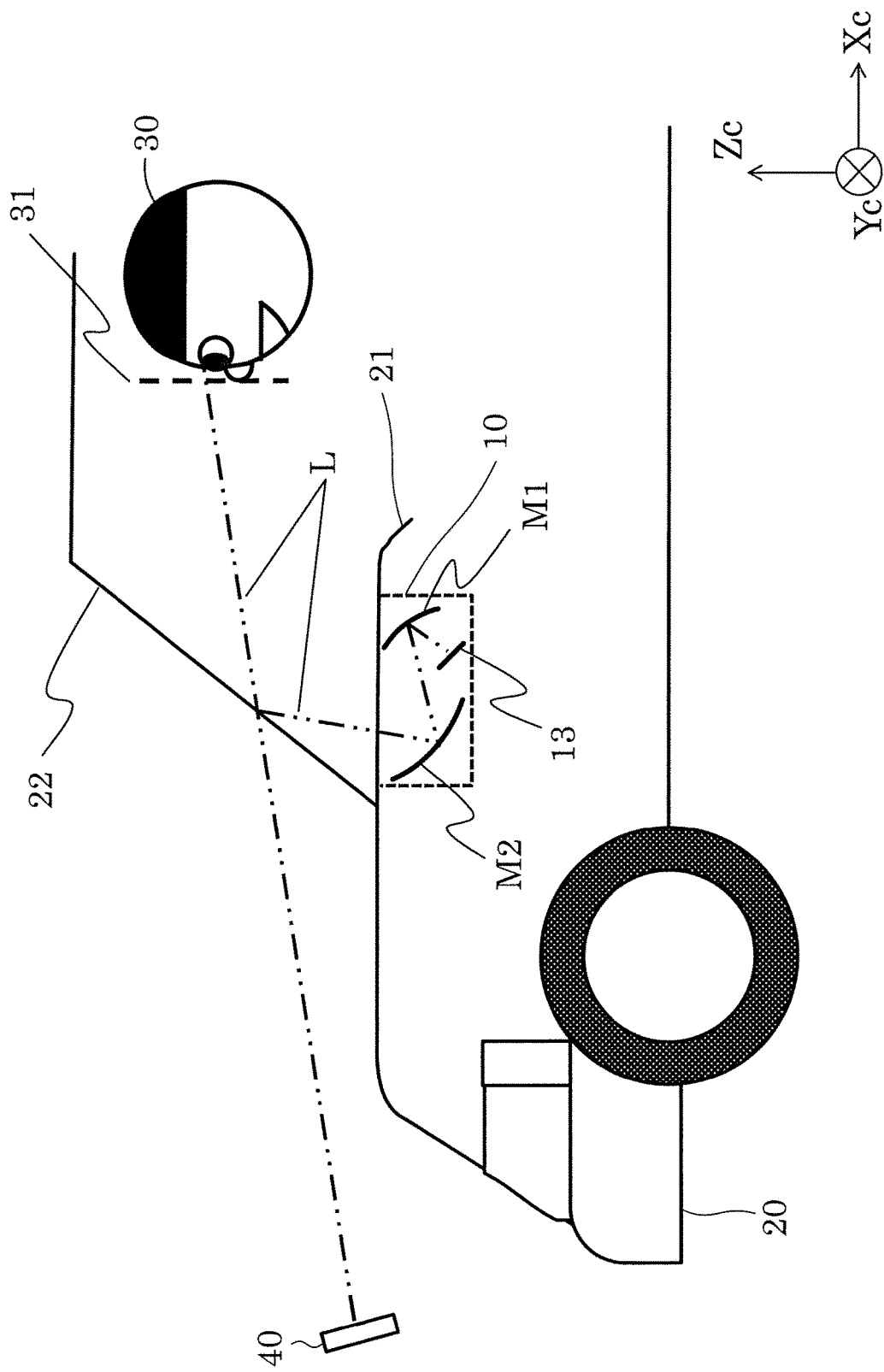
FIG. 1 is a schematic diagram illustrating a cross section of a vehicle including a head-up display according to Embodiment 1.

FIG. 1 is a schematic diagram illustrating a cross section of a vehicle including the head-up display according to Embodiment 1.

Head-up display 10 which projects an image is provided inside dashboard 21 of vehicle 20. Head-up display 10 projects an image to windshield 22 that is a light-transmissive component which is provided in vehicle 20 and on which an image is to be projected. This way, virtual image 40 of the image projected by head-up display 10 is formed on a side of windshield 22 opposite the side thereof where viewer 30 is present. Viewer 30 can visually recognize, via windshield 22, virtual image 40 of the image projected by head-up display 10. Two-dot chain line illustrated in FIG. 1 represents central optical path L of the image projected. Throughout the description, central optical path L is illustrated with a two-dot chain line.

Figure 2:
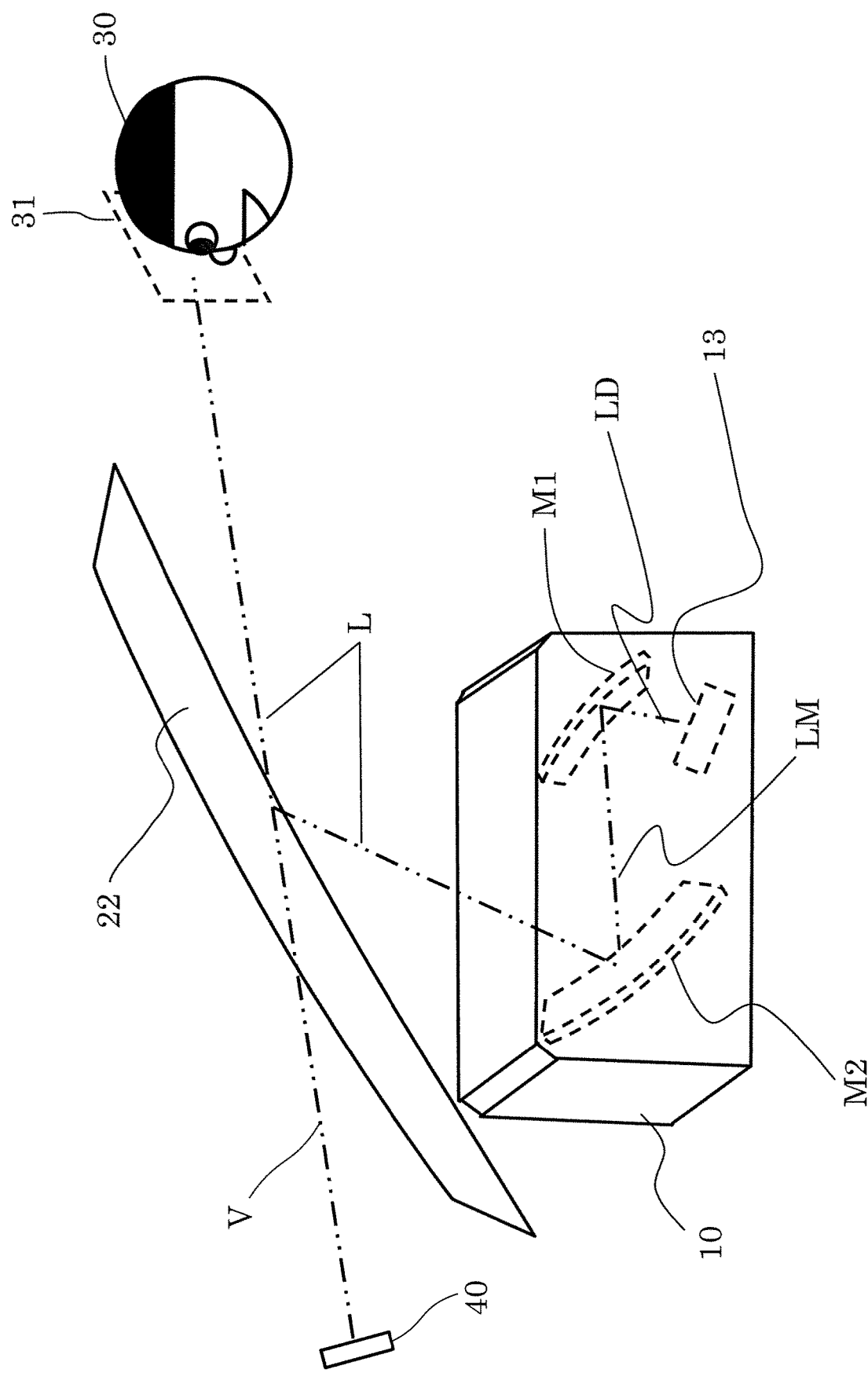
FIG. 2 is a schematic diagram illustrating an optical cross section for describing the head-up display according to Embodiment 1.

FIG. 2 is a schematic diagram of head-up display 10 according to Embodiment 1.

Head-up display 10 projects an image to windshield 22 which is a component on which an image is projected. Head-up display 10 projects an image to windshield 22 to form virtual image 40 on a side of windshield 22 opposite the side thereof where viewer 30 is present. Head-up display 10 includes: display element 13 which is a projection component; and a projection optical system which guides an image displayed by display element 13 to windshield 22 and forms virtual image 40.

The projection optical system includes first mirror M1 and second mirror M2. Second mirror M2 is disposed approximately perpendicularly downward with respect to windshield 22, and guides a ray of light from display element 13 to windshield 22 via first mirror M1. The reflective surface of first mirror M1 has a concave profile. The reflective surface of second mirror M2 has a concave profile. This allows viewer 30 to visually recognize virtual image 40 of the image through windshield 22. Virtual image 40 of the image projected on windshield 22 can be visually recognized by viewer 30 from eye box 31 that is a viewing region supposed in advance. Note that plural optical elements such as a lens element and a reflector may be disposed in the optical path of a ray of light from display element 13 to second mirror M2.

[1.2 Windshield]

Figure 3:
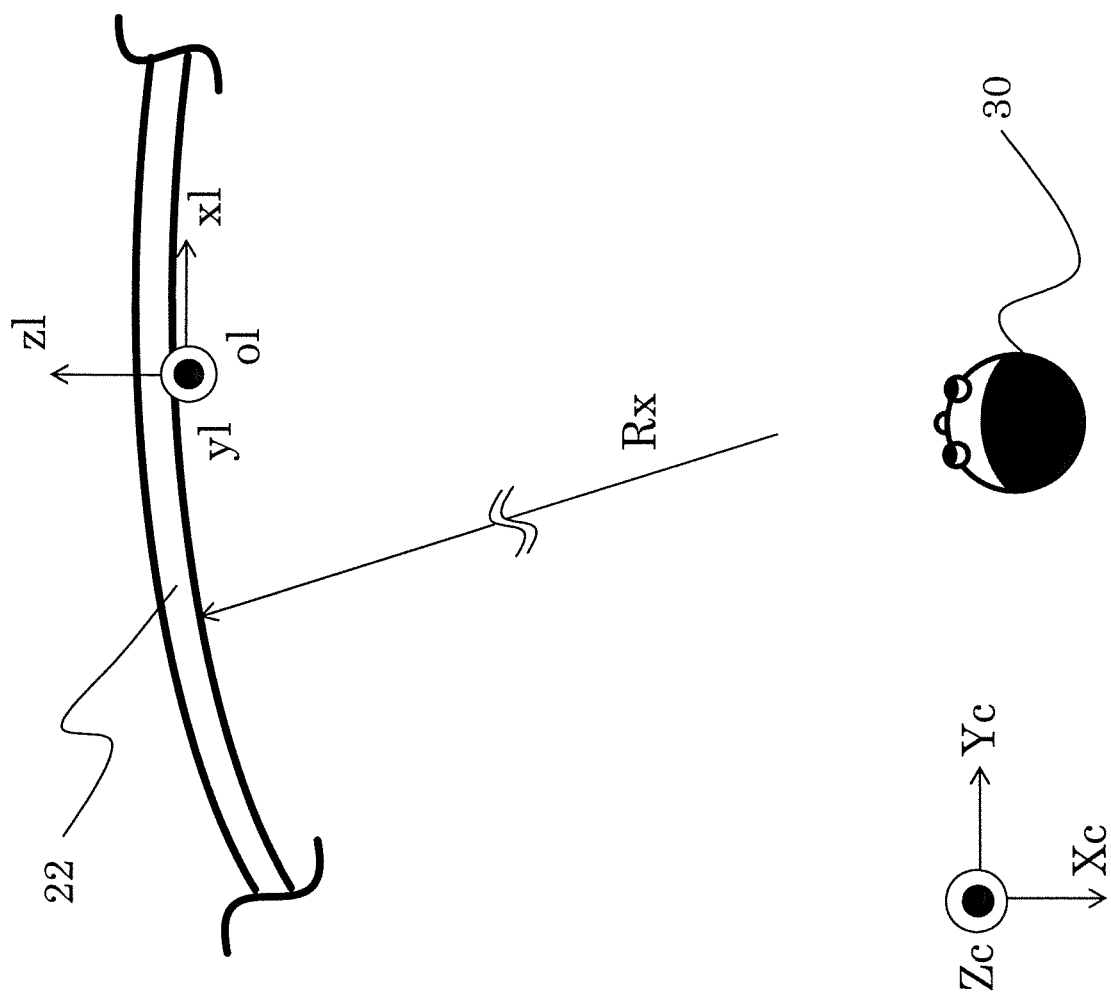
FIG. 3 is a schematic diagram illustrating an optical cross section for describing local curvature Rx of a windshield in an X direction in the head-up display according to Embodiment 1.

FIG. 3 illustrates an Xc-Yc cross section of windshield 22 according to Embodiments 1 to 8, and illustrates local curvature Rx of windshield 22 in the right-left direction viewed from the driver. FIG. 3 also illustrates a local coordinate system (x1, y1, z1 coordinates) of windshield 22.

Figure 4:
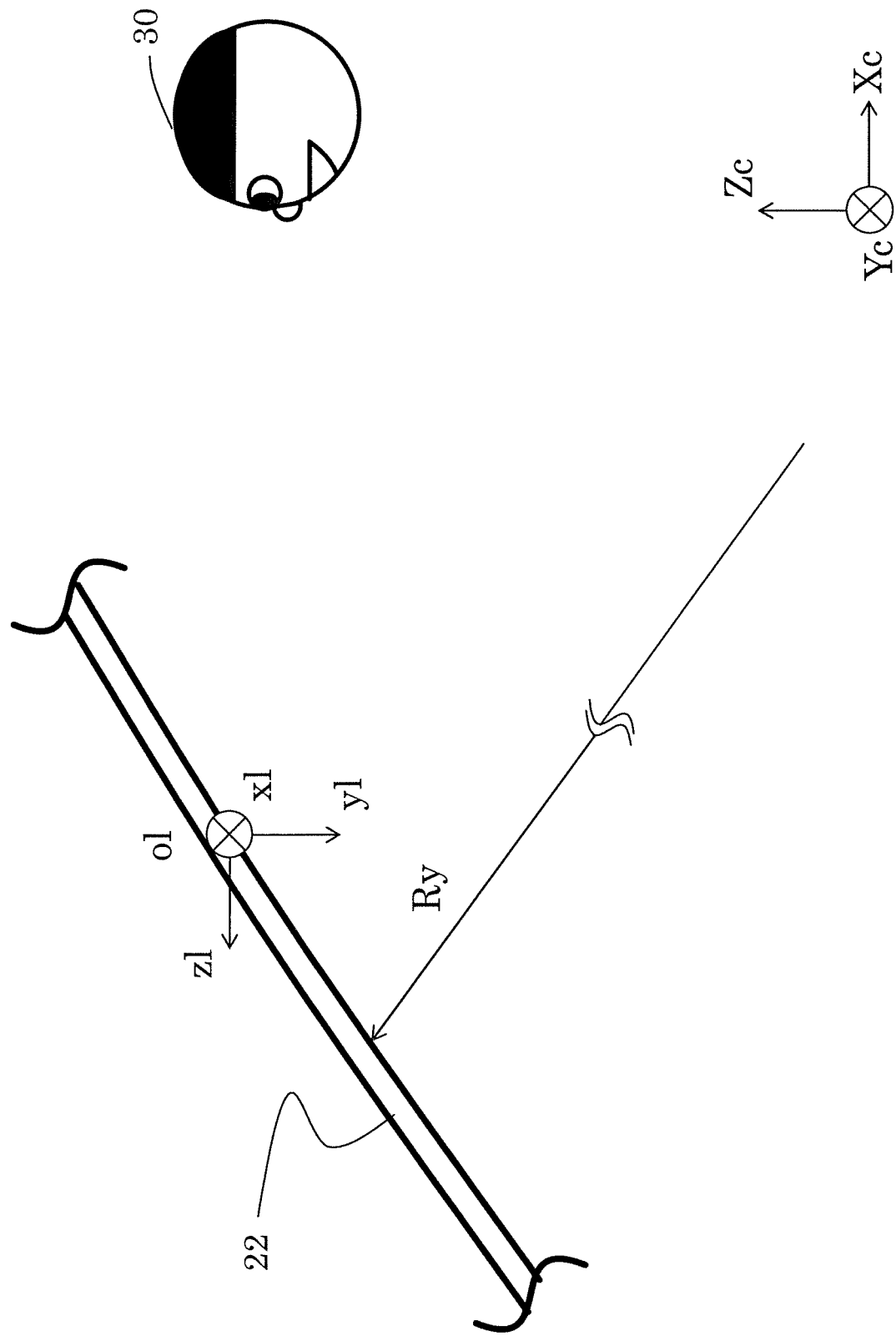
FIG. 4 is a schematic diagram illustrating an optical cross section for describing local curvature Ry of the windshield in a Y direction in the head-up display according to Embodiment 1.

FIG. 4 illustrates an Xc-Zc cross section of windshield 22 according to Embodiments 1 to 8, and illustrates local curvature Ry of windshield 22 in the up-down direction viewed from the driver. FIG. 4 also illustrates a local coordinate system (x1, y1, z1 coordinates) of windshield 22.

Figure 5:
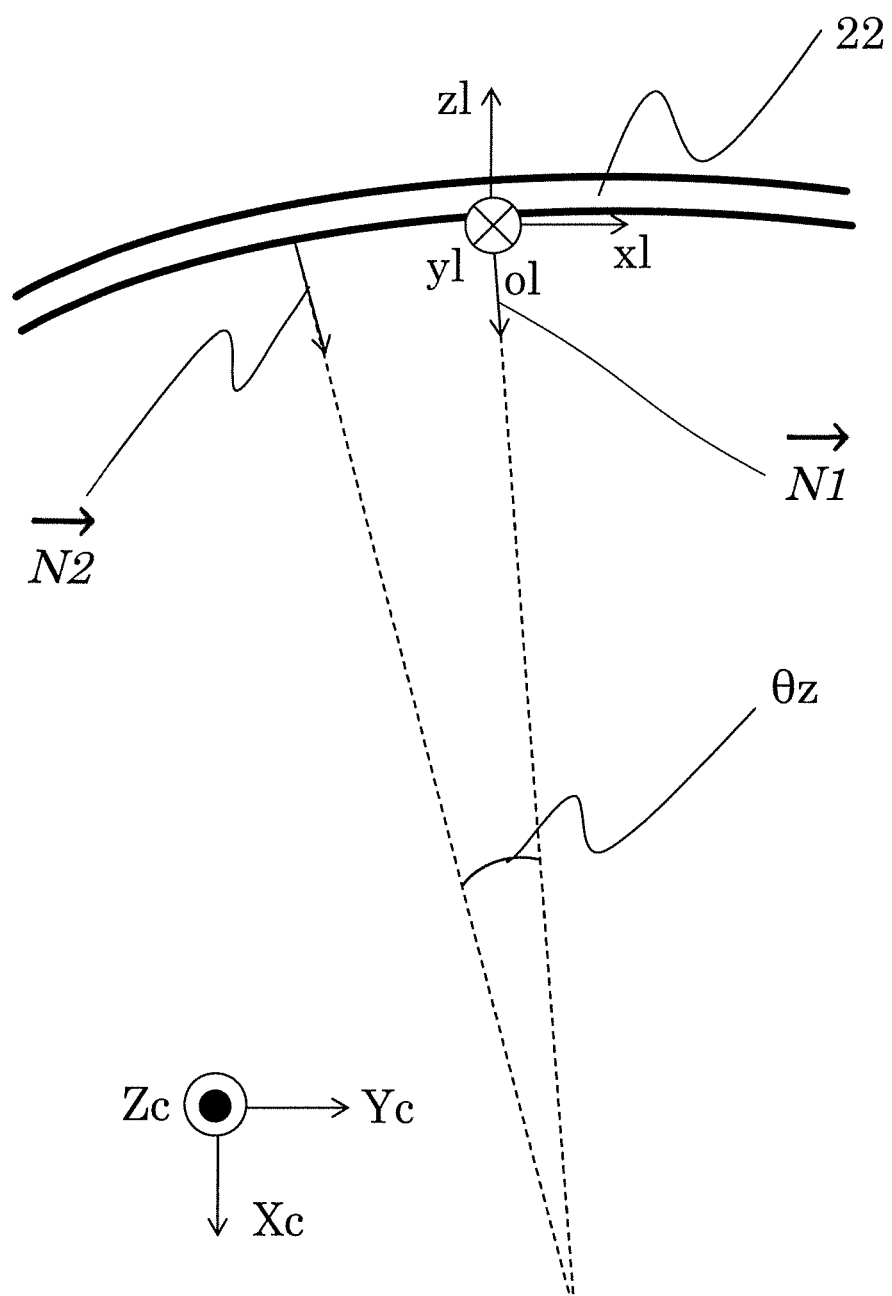
FIG. 5 illustrates inclined angle θz of the windshield in the head-up display according to Embodiment 1.

FIG. 5 illustrates inclined angle θz of windshield 22 according to Embodiments 1 to 8. O1 is the origin of a definition expression that defines the shape of the reflective surface of the windshield; N1 is the normal vector to the reflective surface at origin O1; N2 is the normal vector to the reflective surface at a given point; and θz is the inclined angle formed by normal vector N1 and normal vector N2.

[1.3 First Mirror]

Figure 6:
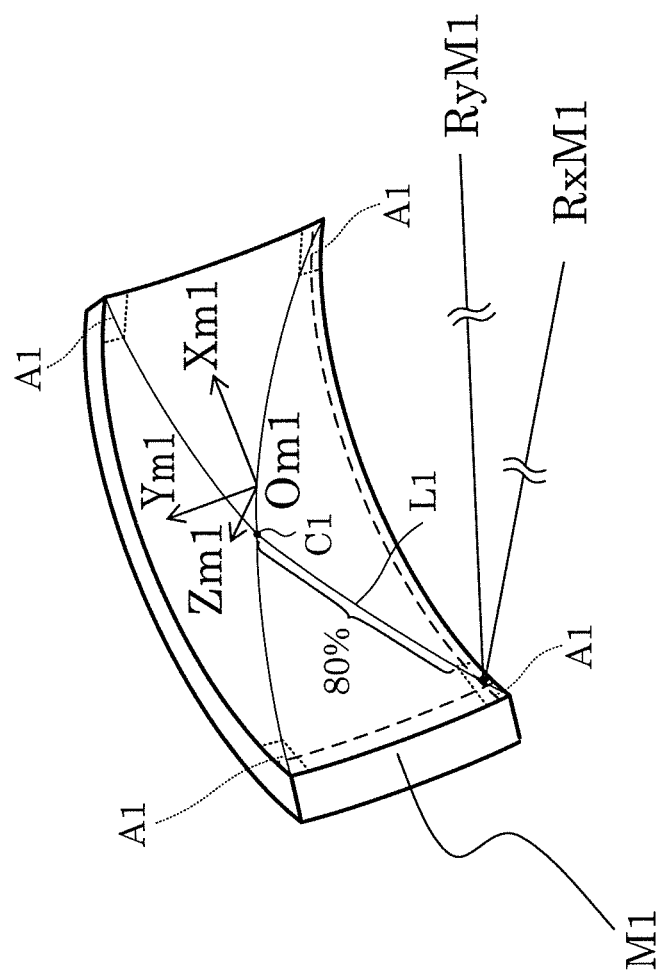
FIG. 6 is a schematic diagram illustrating a coordinate system of a first mirror in the head-up display according to Embodiment 1, local curvature RxM1 of the first mirror in an Xm1 direction, and local curvature RyM1 of the first mirror in a Ym1 direction.

FIG. 6 illustrates a coordinate system (Xm1, Ym1, Zm1 coordinates) of first mirror M1 and origin Om1 of the definition expression of first mirror M1. Zm1, which is the Z axis of the coordinate system of first mirror M1, is defined in the direction of the normal to the reflective surface passing through origin Om1 of the definition expression of first mirror M1. Xm1 and Ym1 are components orthogonal to Zm1. Xm1 is a direction parallel to the longer side of first mirror M1 illustrated in FIG. 6, and is generally the right-left direction viewed from viewer 30 such as the driver. Ym1 is a direction parallel to the shorter side of first mirror M1 illustrated in FIG. 6, and is generally the up-down direction viewed from viewer 30. FIG. 6 also illustrates: local curvature RxM1 of first mirror M1 according to Embodiments 1 to 8 in the X direction defined in a plane parallel to the Xm1-Zm1 plane; and local curvature RyM1 of first mirror M1 in the Y direction defined in a plane parallel to the Ym1-Zm1 plane.

[1.4 Second Mirror]

Figure 7:
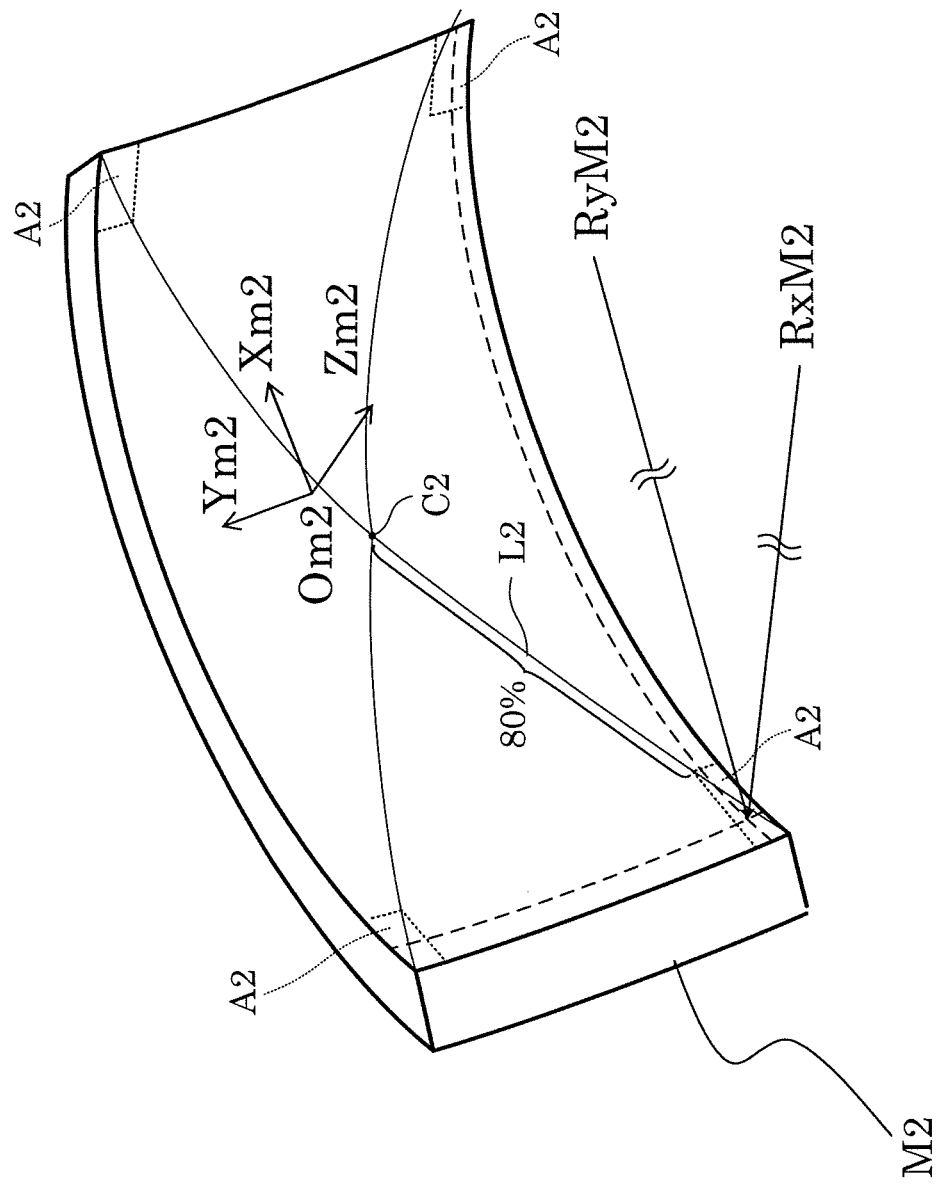
FIG. 7 is a schematic diagram illustrating a coordinate system of a second mirror in the head-up display according to Embodiment 1, local curvature RxM2 of the second mirror in an Xm2 direction, and local curvature RyM2 of the second mirror in a Ym2 direction.

FIG. 7 illustrates a coordinate system (Xm2, Ym2, Zm2 coordinates) of second mirror M2 and origin Om2 of the definition expression of second mirror M2. Zm2, which is the Z axis of the coordinate system of second mirror M2, is defined in the direction of the normal to the reflective surface passing through origin Om2 of the definition expression of second mirror M2. Xm2 and Ym2 are components orthogonal to Zm2. Xm2 is a direction parallel to the longer side of second mirror M2 illustrated in FIG. 7, and is generally the right-left direction viewed from viewer 30. Ym2 is a direction parallel to the shorter side of second mirror M2 illustrated in FIG. 7, and is generally the up-down direction viewed from viewer 30. FIG. 7 also illustrates: local curvature RxM2 of second mirror M2 according to Embodiments 1 to 8, in the X direction defined in a plane parallel to the Xm2-Zm2 plane; and local curvature RyM2 of second mirror M2 in the Y direction defined in a plane parallel to the Ym2-Zm2 plane.

[1.5 Display Element]

Figure 8:
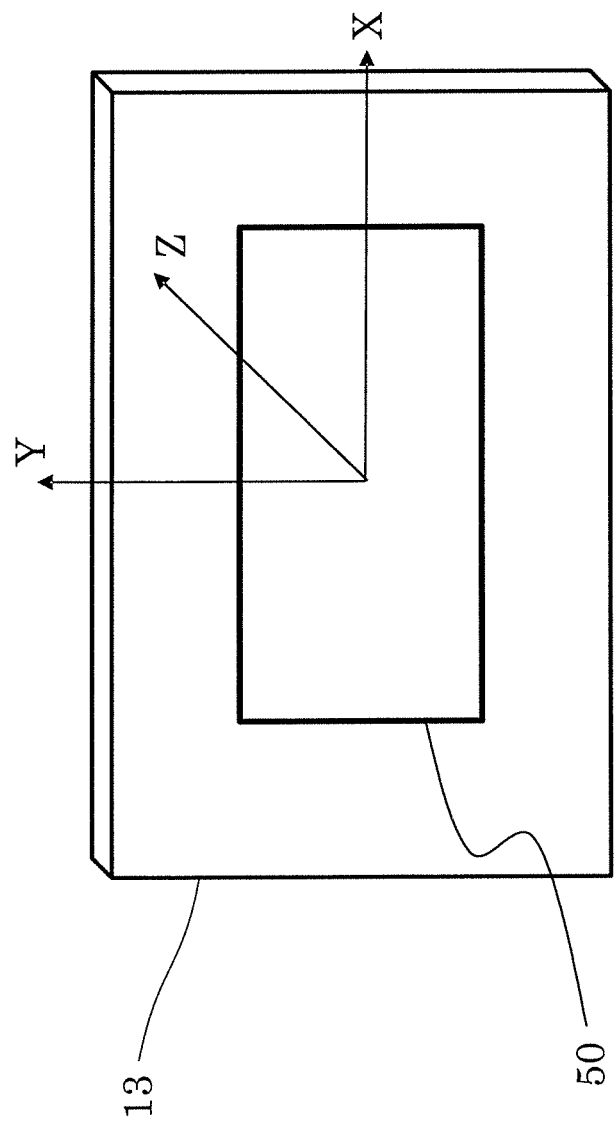
FIG. 8 is a schematic diagram illustrating a coordinate system of a display element in the head-up display according to Embodiments 1 to 8.

FIG. 8 is a schematic diagram illustrating a coordinate system of the display element according to Embodiment 1.

Embodiment 1 has described a liquid crystal display (LCD) as an example of display element 13 which is a projection component. The display element may be a display device such as an organic light-emitting diode (electroluminescent display), a fluorescent display device (seven-segment display), or a plasma display. Moreover, the display element may be a projector or a scanning laser. Thus, the display element is not limited to the LCD.

[2. Conditions and Advantageous Effects etc.]

Head-up display 10 projects an image to windshield 22 which is a component on which an image is projected. Head-up display 10 projects an image to windshield 22 to form virtual image 40 on a side of windshield 22 opposite the side thereof where viewer 30 is present. Head-up display 10 includes: display element 13 which is a projection component that projects an image; and a projection optical system which guides the image to the component on which an image is projected and forms virtual image 40. The projection optical system includes at least two mirrors each having a reflective surface with a concave profile. Windshield 22 has a reflective surface which satisfies the following condition (1) or (2) or (3):

$$0.05 < EBx/Rx\max < 0.50 \tag{1}$$

where EBx denotes the eye box size in the X direction in which viewer 30 can visually recognize virtual image 40, and Rxmax denotes a maximum value of curvature radius Rx in an effective ray area of windshield 22 given that the X axis is the right-left direction viewed from viewer 30.

$$0.05 < EBy/Ry\max < 0.50 \tag{2}$$

where EBy denotes the eye box size in the Y direction in which viewer 30 can visually recognize virtual image 40, and Rymax denotes a maximum value of curvature radius Ry in the effective ray area of windshield 22, given that the Y axis is the up-down direction viewed from viewer 30.

$$1.0°<|θzmax−θzmin|<6.0° \quad (3)$$

where θz denotes an angle formed by a normal vector orthogonal to a tangent plane passing through the origin of a definition expression which defines the shape of windshield 22 and a normal vector to a tangent plane at a given point on windshield 22, θzmax denotes a maximum value of θz, and θzmin denotes a minimum value of θz.

Below the lower limit of condition (1) or (2), the power (refractive power) of windshield 22 weakens and the optical path length allowed for the projection optical system increases. Thus, in order to achieve a decrease in the size of the head-up display and an increase in the screen size, it is better to have a so-called telephoto configuration in which the reflective surface of first mirror M1 has a convex profile and the reflective surface of second mirror M2 has a concave profile. Above the upper limit of condition (1) or (2), the power of windshield 22 increases and the optical path length allowed for the projection optical system decreases. Thus, unless the configuration is a so-called retrofocus configuration in which the reflective surface of first mirror M1 has a concave profile and the reflective surface of second mirror M2 has a convex profile, interference occurs between a ray of light and structural components of the head-up display such as the mirrors, thereby not allowing for a sufficient eye box size (size of eye box 31).

That is to say, it is possible to provide a head-up display smaller in size and larger in screen size, while causing no light ray interference.

Below the lower limit of condition (3), the power (refractive power) of windshield 22 weakens and the optical path length allowed for the projection optical system increases. Thus, in order to achieve a decrease in the size of the head-up display, it is better to have a so-called telephoto configuration in which the reflective surface of first mirror M1 has a convex profile and the reflective surface of second mirror M2 has a concave profile. Above the upper limit of condition (3), the power of windshield 22 becomes too strong and the optical path length allowed for the projection optical system decreases. Thus, unless the configuration is a so-called retrofocus configuration in which, for example, the reflective surface of first mirror M1 has a concave profile and the reflective surface of second mirror M2 has a convex profile, interference occurs between a ray of light and structural components of the head-up display, thereby not allowing for a sufficient eye box size.

Head-up display 10 may satisfy the following condition (4):

$$0.5<LM/LD<8.0 \quad (4)$$

where LM denotes the distance between second mirror M2 and first mirror M1 in central optical path L of the projection optical system from display element 13 to a virtual image, and LD denotes the distance in central optical path L from display element 13 to first mirror M1.

Below 0.5, which is the lower limit of condition (4), the distance between display element 13 and first mirror M1 increases, resulting in an increase in the size of the head-up display. Above 8.0, which is the upper limit of condition (4), the distance between display element 13 and first mirror M1 becomes too short, resulting in interference between display element 13 and a ray of light.

That is to say, it is possible to achieve a decrease in the size of head-up display 10 by satisfying condition (4).

Furthermore, head-up display 10 may satisfy the following condition (5):

$$0.0<(LD+LM)V<0.2 \quad (5)$$

where LM denotes the distance between second mirror M2 and first mirror M1 in central optical path L of the projection optical system from display element 13 to a virtual image, LD denotes the distance from display element 13 to first mirror M1 in central optical path L, and V denotes the distance from the center of the viewing region of viewer 30 to the center of virtual image 40.

The lower limit of condition (5) is 0.0 since LD and LM are non-zero finite values. Above 0.2, which is the upper limit of condition (5), the distance between display element 13 and first mirror 12 and the distance between first mirror M1 and second mirror M2 both increase, resulting in an increase in the size of the head-up display.

That is to say, it is possible to achieve a decrease in the size of head-up display 10 by satisfying condition (5).

Figure 9:
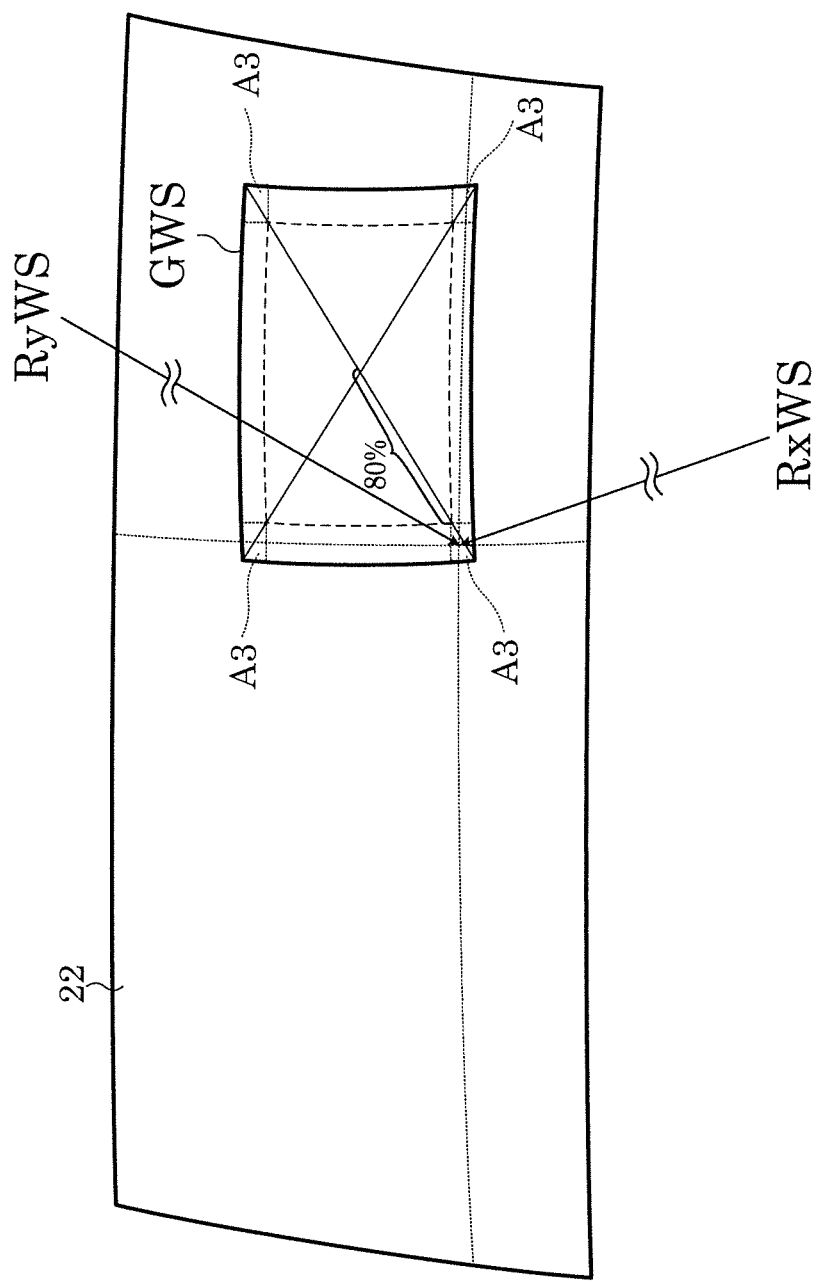
FIG. 9 is a schematic diagram illustrating a windshield on which an image is projected by the head-up display according to Embodiments 1 to 8.

Head-up display 10 may satisfy the following condition (6) in the case where each of windshield 22, first mirror M1, and second mirror M2 has a positive curvature radius when having a reflective surface with a concave profile and a negative curvature radius when having a reflective surface with a convex profile.

$$1<RxWS/RxM2+RxM2/RxM1<70 \quad (6)$$

where RxM1 denotes, as illustrated in FIG. 6, the curvature radius of first mirror M1 in a direction parallel to the longer side of first mirror M1 (Xm1 direction) at at least one of reflection points of a ray of light passing through first regions A1 that are approximately rectangular regions similar in shape to the reflective surface of first mirror M1, first regions A1 each having, as opposite angles, one of the four corners of first mirror M1 and a point at 80%, from approximate center C1 of first mirror M1, of first line segment L1 (one line segment is shown in FIG. 6) extending from approximate center C1 of first mirror M1 to the one of the four corners of first mirror M1, RxM2 denotes the curvature radius of second mirror M2 in a direction parallel to the longer side of second mirror M2 (Xm2 direction) at at least one of reflection points of a ray of light passing through second regions A2 that are approximately rectangular regions similar in shape to the reflective surface of second mirror M2, second regions A2 each having, as opposite angles, one of the four corners of second mirror M2 and a point at 80%, from approximate center C2 of second mirror M2, of second line segment L2 extending from approximate center C2 of second mirror M2 to the one of the four corners of second mirror M2, and RxWS denotes, as illustrated in FIG. 9, the curvature radius of windshield 22 in the horizontal direction (Yc direction) at at least one of reflection points of a ray of light passing through third regions A3 that are approximately rectangular regions each having, as opposite angles, one of the four corners of image GWS projected on windshield 22 and a point at 80%, from an approximate center of image GWS, of a line segment extending from the approximate center of image GWS to the one of the four corners of image GWS.

Above 70, which is the upper limit of condition (6), aberration that occurs at windshield 22 cannot be corrected by first mirror M1 and second mirror M2, and various aberrations, particularly curvature of field, astigmatism, and distortion, increase, resulting in deterioration in display quality; for example, the virtual image does not look sharp or becomes distorted. Below the lower limit of 1, the powers of first mirror M1 and second mirror M2 decrease and the optical path length increases, resulting in an increase in the size of the head-up display.

Head-up display 10 may satisfy the following condition (6)':

$$1 < RxWS/RxM2 + RxM2/RxM1 < 55 \quad (6)'$$

By satisfying the above condition (6) or condition (6)' not only at at least one of the reflection points of a ray of light passing through first regions A1, second regions A2, and third regions A3 but in all the areas of first regions A1, second regions A2, and third regions A3, the above-described advantageous effect can be further achieved.

First regions A1 to third regions A3 are approximate rectangular regions each having, as opposite angles, one of the four corners and a point at 80% from the center; however, first regions A1 to third regions A3 may be approximate rectangular regions each having, as opposite angles, one of the four corners and a point at 60% from the center. With this, the above-described advantageous effect can be achieved by satisfying above condition (6) or condition (6)' at at least one of the reflection points of a ray of light passing through first regions A1, second regions A2, and third regions A3.

The above-described advantageous effect can be further achieved by satisfying above condition (6) or condition (6)' in all the areas in third regions A3 of windshield 22 on which an image is projected, all the areas in first regions A1 of first mirror M1 where a ray of light passes through, and all the areas in second regions A2 of second mirror M2 where a ray of light passes through.

Head-up display 10 may satisfy the following condition (7) in the case where each of windshield 22, first mirror M1, and second mirror M2 has a positive curvature radius when having a reflective surface with a concave profile and has a negative curvature radius when having a reflective surface with a convex profile.

$$-50 < RyWS/RyM2 + RyM2/RyM1 < 100 \quad (7)$$

where RyM1 denotes the curvature radius of first mirror M1 in a direction parallel to the shorter side of first mirror M1 (Ym1 direction) at at least one of reflection points of a ray of light passing through first regions A1 that are approximately rectangular regions each having, as a diagonal, a line segment connecting one of four corners of first mirror M1 and a point at 80%, from an approximate center of first mirror M1, of a line segment extending from the approximate center of first mirror M1 to the one of the four corners of first mirror M1, where RyM2 denotes the curvature radius of second mirror M2 in a direction parallel to the shorter side of second mirror M2 (Ym2 direction) at at least one of reflection points of a ray of light passing through second regions A2 that are approximately rectangular regions each having, as opposite angles, one of four corners of second mirror M2 and a point at 80%, from an approximate center of second mirror M2, of a line segment extending from the approximate center of second mirror M1 to the one of the four corners of second mirror M2, and RyWS denotes the curvature radius of windshield 22 in the vertical direction (Zc direction) at at least one of reflection points of a ray of light passing through third regions A3 that are approximately rectangular regions each having, as opposite angles, one of the four corners of an image projected on windshield 22 and a point at 80%, from an approximate center of the image, of a line segment extending from the approximate center of the image to the one of the four corners of the image.

Above 100, which is the upper limit of condition (7), aberration that occurs at windshield 22 cannot be corrected by first mirror M1 and second mirror M2, and various aberrations, particularly curvature of field, astigmatism, and distortion, increase, resulting in deterioration in display quality; for example, the virtual image does not look sharp or becomes distorted. Below the lower limit of—40, aberration that occurs at windshield 22 cannot be corrected by first mirror M1 and second mirror M2, and various aberrations such as curvature of field increase, resulting in deterioration in display quality; for example, the virtual image does not look sharp or becomes distorted.

Head-up display 10 may satisfy the following condition (7)';

$$-30 < RyWS/RyM2 + RyM2/RyM1 < 90 \quad (7)'$$

By satisfying the above condition (7) or condition (7)' not only at at least one of the reflection points of a ray of light passing through first regions A1, second regions A2, and third regions A3 but in all the areas of first regions A1, second regions A2, and third regions A3, the above-described advantageous effect can be further achieved.

First regions A1 to third regions A3 are approximate rectangular regions each having, as a diagonal, a line segment connecting one of the four corners and a point at 80% from the center; however, first regions A1 to third regions A3 may be approximate rectangular regions each having, as a diagonal, a line segment connecting one of the four corners and a point at 60% from the center. By satisfying the above condition (7) or condition (7)' at at least one of the reflection points of a ray of light passing through first regions A1, second regions A2, and third regions A3, the above-described advantageous effect can be further achieved.

The above-described advantageous effect can be further achieved by satisfying above condition (7) or condition (7)' in all the areas in third regions A3 of windshield 22 on which an image is projected, all the areas in first regions A1 of first mirror M1 where a ray of light passes through, and all the areas in second regions A2 of second mirror M2 where a ray of light passes through.

Other Embodiments

Embodiment 1 has described first mirror M1 and second mirror M2 as each having a reflective surface with a concave profile as one example. First mirror M1 and second mirror M2 may have any reflective surface so long as the reflective surface has an approximately concave profile near the center. Accordingly, the reflective surfaces of first mirror M1 and second mirror M2 are not limited to reflective surfaces entirely having a concave profile. However, the optical path length allowed for the projection optical system can be increased when the reflective surfaces of first mirror M1 and second mirror M2 have a concave profile. This makes it possible to reduce interference between a ray of light and structural components of the head-up display and to secure a sufficient eye box size.

An end portion of the reflective surface of first mirror M1 or second mirror M2 may have a locally convex profile. When an end portion of the reflective surface of first mirror M1 or second mirror M2 has a locally convex profile, it is possible to correct various aberrations of windshield 22 that occur in the vicinity of the eye box, in particular, curvature of field, astigmatism, and distortion.

NUMERICAL EXAMPLES

The following describes specific numerical examples of the head-up display according to the present disclosure. Note that the following numerical examples use mm as the unit of length and degree as the unit of angle in the tables below. A free-form surface is defined by the following equations:

$$z = \frac{cr^2}{\sqrt{1-(1+k)c^2 r^2}} + \sum_{j=2} c_j x^m y^n \quad \text{[Equation 1]}$$

$$j = \frac{(m+n)^2 + m + 3n}{2} + 1 \quad \text{[Equation 2]}$$

Here, z is the amount of sag at the position (x, y) from an axis which defines a plane; r is a curvature radius at the origin of the axis defining the plane; c is a curvature at the origin of the axis defining the plane; k is the conic constant; m and n are integers satisfying Equation 2; and Cj is a coefficient of a monomial $x^m y^n$.

In each numerical example, the coordinate origin serving as the reference is the center of display image 50 of display element 13, and defines the X axis, Y axis, and Z axis as illustrated in FIG. 8.

Moreover, in decentering data in each numerical example, ADE is the amount of rotation from the Z-axis direction to the Y-axis direction about the X axis, BDE is the amount of rotation from the X-axis direction to the Z-axis direction about the Y axis, and CDE is the amount of rotation from the X-axis direction to the Y-axis direction about the Z axis.

NUMERICAL EXAMPLE 1

A projection optical system according to Numerical Example 1 is an example of the projection optical system. Table 1 shows configuration data of the projection optical system according to Numerical Example 1, and Table 2 shows coefficients of polynomial free-form surfaces.

TABLE 1

| Surface | | | Decentering Data | | | | | |
|---|---|---|---|---|---|---|---|---|
| | No. | Shape | X | Y | Z | ADE | BDE | CDE |
| Display Surface | 1 | — | 0 | 0 | 0 | 0 | 0 | 0 |
| First Mirror M1 | 2 | Free-form Surface | 0 | 26.30227 | 53.92764 | −2.5417 | −0.0147 | −4.9763 |
| Second Mirror M2 | 3 | Free-form Surface | −0.04625 | 79.26919 | −33.93396 | 0.115 | 11.2965 | −11.2821 |
| Windshield | 4 | Free-form Surface | −176.9423 | 246.74913 | 387.54579 | 157.2339 | −27.3676 | 3.2926 |
| Viewer | 5 | — | −468.6151 | 4.61138 | 893.26731 | 157.2339 | −27.3676 | 3.2926 |

TABLE 2

| SurfaceNo. | | Polynominal Coefficients |
|---|---|---|
| | C(Curvature) | 8.7649.E−03 |
| 2 | C1 | 0.0000.E+00 |
| | C2 | 0.0000.E+00 |
| | C3 | 0.0000.E+00 |
| | C4 | −5.4591.E−03 |
| | C5 | 3.8619.E−04 |
| | C6 | −6.9817.E−03 |
| | C7 | 3.7992.E−06 |
| | C8 | 1.1800.E−05 |
| | C9 | 4.3639.E−06 |
| | C10 | 1.1630.E−05 |
| | C11 | −2.6702.E−07 |
| | C12 | −1.1954.E−07 |
| | C13 | −2.3842.E−07 |
| | C14 | −3.9397.E−08 |
| | C15 | −3.8641.E−07 |
| | C16 | −4.5368.E−11 |
| | C17 | 6.5596.E−10 |
| | C18 | −4.8650.E−10 |
| | C19 | 4.8332.E−10 |
| | C20 | 1.6311.E−10 |
| | C21 | 5.7712.E−10 |
| | C22 | 1.9737.E−11 |
| | C23 | 2.4610.E−11 |
| | C24 | −2.8893.E−11 |
| | C25 | 2.4901.E−12 |
| | C26 | −2.0376.E−12 |
| | C27 | 1.9191.E−11 |
| | C28 | 2.9258.E−11 |
| | C29 | 0.0000.E+00 |
| | C30 | 0.0000.E+00 |
| | C31 | 0.0000.E+00 |
| | C32 | 0.0000.E+00 |
| | C33 | 0.0000.E+00 |
| | C34 | 0.0000.E+00 |
| | C35 | 0.0000.E+00 |
| | C36 | 0.0000.E+00 |
| | C(Curvature) | −5.7041.E−03 |
| 3 | C1 | 0.0000.E+00 |
| | C2 | 0.0000.E+00 |
| | C3 | 0.0000.E+00 |
| | C4 | 3.8785.E−03 |
| | C5 | 3.7699.E−04 |
| | C6 | 2.5716.E−03 |
| | C7 | 1.4996.E−06 |
| | C8 | −3.8301.E−07 |
| | C9 | 2.0099.E−06 |
| | C10 | 6.3839.E−06 |
| | C11 | 5.5003.E−09 |
| | C12 | −2.3256.E−08 |
| | C13 | 3.4601.E−08 |
| | C14 | −2.7854.E−08 |
| | C15 | −1.9756.E−07 |
| | C16 | 8.3790.E−13 |
| | C17 | 4.2744.E−11 |
| | C18 | −4.7640.E−11 |
| | C19 | −3.8735.E−10 |
| | C20 | 5.4213.E−10 |
| | C21 | −2.0612.E−10 |
| | C22 | 1.6253.E−12 |
| | C23 | 2.1282.E−12 |
| | C24 | 7.8393.E−13 |

TABLE 2-continued

| SurfaceNo. | Polynominal Coefficients |
|---|---|
| C25 | 2.5023.E−12 |
| C26 | 5.9763.E−12 |

NUMERICAL EXAMPLE 2

A projection optical system according to Numerical Example 2 is an example of the projection optical system. Table 3 shows configuration data of the projection optical system according to Numerical Example 2, and Table 4 shows coefficients of polynomial free-form surfaces.

TABLE 3

| Surface | | | Decentering Data | | | | | |
|---|---|---|---|---|---|---|---|---|
| | No. | Shape | X | Y | Z | ADE | BDE | CDE |
| Display Surace | 1 | — | 0 | 0 | 0 | 0 | 0 | 0 |
| First Mirror M1 | 2 | Free-form Surface | 0 | 29.07664 | 59.61594 | −4.8155 | −1.5748 | −4.3769 |
| Second Mirror M2 | 3 | Free-form Surface | −5.0368 | 91.25116 | −27.0073 | −4.1331 | 8.8076 | −9.5006 |
| Windshield | 4 | Free-form Surface | −164.8696 | 226.376 | 410.59851 | 153.3979 | −23.971 | 2.5484 |
| Viewer | 5 | — | −423.1527 | −56.57048 | 915.17304 | 153.3979 | −23.974 | 2.5484 |

TABLE 2-continued

| SurfaceNo. | Polynominal Coefficients |
|---|---|
| C27 | 1.7049.E−11 |
| C28 | 3.2482.E−11 |
| C29 | 0.0000.E+00 |
| C30 | 0.0000.E+00 |
| C31 | 0.0000.E+00 |
| C32 | 0.0000.E+00 |
| C33 | 0.0000.E+00 |
| C34 | 0.0000.E+00 |
| C35 | 0.0000.E+00 |
| C36 | 0.0000.E+00 |
| C(Curvature) | −2.0000.E−03 |

| | SurfaceNo. | Polynominal Coefficients |
|---|---|---|
| 4 | C1 | 0.0000.E+00 |
| | C2 | 2.7104.E−01 |
| | C3 | 2.1294.E+00 |
| | C4 | 2.9549.E−04 |
| | C5 | −2.9390.E−04 |
| | C6 | −8.4646.E−04 |
| | C7 | 2.6558.E−07 |
| | C8 | 7.1237.E−07 |
| | C9 | 1.3243.E−06 |
| | C10 | 3.1699.E−06 |
| | C11 | 2.5212.E−10 |
| | C12 | −8.6928.E−10 |
| | C13 | −2.2648.E−09 |
| | C14 | −2.7853.E−09 |
| | C15 | −4.8453.E−09 |
| | C16 | 1.5623.E−13 |
| | C17 | 1.0711.E−12 |
| | C18 | 2.6049.E−12 |
| | C19 | 4.5865.E−12 |
| | C20 | 3.2059.E−12 |
| | C21 | 5.4217.E−12 |
| | C22 | 0.0000.E+00 |
| | C23 | 0.0000.E+00 |
| | C24 | 0.0000.E+00 |
| | C25 | 0.0000.E+00 |
| | C26 | 0.0000.E+00 |
| | C27 | 0.0000.E+00 |
| | C28 | 0.0000.E+00 |
| | C29 | 0.0000.E+00 |
| | C30 | 0.0000.E+00 |
| | C31 | 0.0000.E+00 |
| | C32 | 0.0000.E+00 |
| | C33 | 0.0000.E+00 |
| | C34 | 0.0000.E+00 |
| | C35 | 0.0000.E+00 |
| | C36 | 0.0000.E+00 |

TABLE 4

| Surface No. | | Polynominal Coefficients | | |
|---|---|---|---|---|
| | c(Curvature) | | 7.9202.E−03 | |
| 2 | C1 | 0.0000.E+00 | C19 | 1.3554.E−09 |
| | C2 | 0.0000.E+00 | C20 | −3.3588.E−10 |
| | C3 | 0.0000.E+00 | C21 | 8.9302.E−10 |
| | C4 | −5.5896.E−03 | C22 | 2.9770.E−12 |
| | C5 | 4.0088.E−04 | C23 | 8.9645.E−12 |
| | C6 | −7.0201.E−03 | C24 | −2.5106.E−11 |
| | C7 | −8.4300.E−07 | C25 | −6.1732.E−12 |
| | C8 | 9.7720.E−06 | C26 | −1.0759.E−11 |
| | C9 | 2.0382.E−06 | C27 | 1.1295.E−11 |
| | C10 | 8.8287.E−06 | C28 | −2.9634.E−12 |
| | C11 | −1.4860.E−07 | C29 | 0.0000.E+00 |
| | C12 | −1.7876.E−08 | C30 | 0.0000.E+00 |
| | C13 | −2.0215.E−07 | C31 | 0.0000.E+00 |
| | C14 | −1.4056.E−09 | C32 | 0.0000.E+00 |
| | C15 | −2.2166.E−07 | C33 | 0.0000.E+00 |
| | C16 | −1.8401.E−10 | C34 | 0.0000.E+00 |
| | C17 | 4.3417.E−10 | C35 | 0.0000.E+00 |
| | C18 | −6.7058.E−10 | C36 | 0.0000.E+00 |
| | C(Curvature) | | −6.3443.E−03 | |
| 3 | C1 | 0.0000.E+00 | C19 | −5.3154.E−10 |
| | C2 | 0.0000.E+00 | C20 | 4.9051.E−10 |
| | C3 | 0.0000.E+00 | C21 | 6.3551.E−10 |
| | C4 | 3.9046.E−03 | C22 | 1.1211.E−12 |
| | C5 | 4.8680.E−04 | C23 | 7.8109.E−13 |
| | C6 | 1.9001.E−03 | C24 | −2.0746.E−12 |
| | C7 | 7.6547.E−07 | C25 | −1.0068.E−11 |
| | C8 | −2.3949.E−06 | C26 | 1.7192.E−11 |
| | C9 | 1.6347.E−06 | C27 | 2.5986.E−11 |
| | C10 | 7.8946.E−06 | C28 | 4.8583.E−11 |
| | C11 | 1.9301.E−08 | C29 | 0.0000.E+00 |
| | C12 | −3.5995.E−09 | C30 | 0.0000.E+00 |
| | C13 | 6.5992.E−08 | C31 | 0.0000.E+00 |
| | C14 | 3.1899.E−08 | C32 | 0.0000.E+00 |
| | C15 | −3.3778.E−07 | C33 | 0.0000.E+00 |
| | C16 | −2.0983.E−11 | C34 | 0.0000.E+00 |
| | C17 | −2.4549.E−11 | C35 | 0.0000.E+00 |
| | C18 | −3.0272.E−10 | C36 | 0.0000.E+00 |
| | C(Curvature) | | −2.0000.E−03 | |
| 4 | C1 | 0.0000.E+00 | C19 | 2.2823.E−12 |
| | C2 | 2.5000.E−01 | C20 | 2.6744.E−12 |
| | C3 | 2.1680.E+00 | C21 | 6.3122.E−12 |
| | C4 | 2.2000.E−04 | C22 | 1.0659.E−19 |
| | C5 | −1.3000.E−04 | C23 | −1.5171.E−20 |
| | C6 | −1.1000.E−03 | C24 | 1.3092.E−17 |

TABLE 4-continued

| Surface No. | | Polynominal Coefficients | | |
|---|---|---|---|---|
| | C7 | 11897.E−07 | C25 | −3.9844.E−20 |
| | C8 | 1.6224.E−07 | C26 | −4.0706.E−18 |
| | C9 | 8.6740.E−07 | C27 | −1.4365.E−20 |
| | C10 | 3.2392.E−06 | C28 | 3.5747.E−19 |
| | C11 | 1.0012.E−10 | C29 | 0.0000.E+00 |
| | C12 | 3.4292.E−11 | C30 | 0.0000.E+00 |
| | C13 | −8.9307.E−10 | C31 | 0.0000.E+00 |
| | C14 | −2.1255.E−09 | C32 | 0.0000.E+00 |
| | C15 | −5.8148.E−09 | C33 | 0.0000.E+00 |
| | C16 | 4.7836.E−14 | C34 | 0.0000.E+00 |
| | C17 | 2.2136.E−13 | C35 | 0.0000.E+00 |
| | C18 | 8.8278.E−14 | C36 | 0.0000.E+00 |

NUMERICAL EXAMPLE 3

A projection optical system according to Numerical Example 3 is an example of the projection optical system. Table 5 shows configuration data of the projection optical system according to Numerical Example 3, and Table 6 shows coefficients of polynomial free-form surfaces.

TABLE 5

| Surface | | | Decentering Data | | | | | |
|---|---|---|---|---|---|---|---|---|
| | No. | Shape | X | Y | Z | ADE | BDE | CDE |
| Display Surface | 1 | — | 0 | 0 | 0 | 0 | 0 | 0 |
| First Mirror M1 | 2 | Free-form Surface | 0 | 53.3698 | 104.74412 | 6.0465 | 7.9511 | 8.1657 |
| Second Mirror M2 | 3 | Free-form Surface | 40.94016 | 95.13242 | −14.18467 | 12.1551 | 27.9434 | −1.779 |
| Windshield | 4 | Free-form Surface | −248.9666 | 290.56934 | 268.25662 | 160.5367 | −43.2613 | −6.29 |
| Viewer | 5 | — | −680.5871 | 110.93134 | 695.80577 | 160.5367 | −43.2613 | −6.29 |

TABLE 6

| Surface No. | | Polynominal Coefficients | | |
|---|---|---|---|---|
| | C(Curvature) | | 7.0159.E−03 | |
| 2 | C1 | 0.0000.E+00 | C19 | 1.8575.E−10 |
| | C2 | 0.0000.E+00 | C20 | −6.9474.E−11 |
| | C3 | 0.0000.E+00 | C21 | −1.5885.E−11 |
| | C4 | −3.7439.E−03 | C22 | −2.3475.E−12 |
| | C5 | −6.7732.E−05 | C23 | 8.1179.E−13 |
| | C6 | −4.6659.E−03 | C24 | −7.8865.E−12 |
| | C7 | 2.3718.E−06 | C25 | 4.0114.E−12 |
| | C8 | −1.8704.E−06 | C26 | −4.8123.E−12 |
| | C9 | 4.2325.E−06 | C27 | 2.1289.E−12 |
| | C10 | 1.5750.E−06 | C28 | 6.4542.E−13 |
| | C11 | −5.1232.E−08 | C29 | 0.0000.E+00 |
| | C12 | −7.8398.E−09 | C30 | 0.0000.E+00 |
| | C13 | −9.5417.E−08 | C31 | 0.0000.E+00 |
| | C14 | −3.7470.E−08 | C32 | 0.0000.E+00 |
| | C15 | −8.3893.E−08 | C33 | 0.0000.E+00 |
| | C16 | 1.0764.E−11 | C34 | 0.0000.E+00 |
| | C17 | 7.3070.E−11 | C35 | 0.0000.E+00 |
| | C18 | −1.0386.E−10 | C36 | 0.0000.E+00 |
| | C(Curvature) | | −4.9774.E−03 | |
| 3 | C1 | 0.0000.E+00 | C19 | −9.1957.E−13 |
| | C2 | 0.0000.E+00 | C20 | 1.3819.E−11 |
| | C3 | 0.0000.E+00 | C21 | −8.1672.E−12 |
| | C4 | 3.2864.E−03 | C22 | 2.4174.E−13 |
| | C5 | 2.2943.E−05 | C23 | −3.8456.E−14 |
| | C6 | 2.6326.E−03 | C24 | 6.7474.E−13 |
| | C7 | 5.4497.E−07 | C25 | 1.8637.E−13 |
| | C8 | −7.7097.E−07 | C26 | 1.3536.E−12 |
| | C9 | 1.2624.E−06 | C27 | 1.9804.E−12 |
| | C10 | 8.3457.E−07 | C28 | 2.8516.E−12 |
| | C11 | 1.4712.E−08 | C29 | 0.0000.E+00 |
| | C12 | −1.4247.E−09 | C30 | 0.0000.E+00 |
| | C13 | 2.5497.E−08 | C31 | 0.0000.E+00 |
| | C14 | −1.4923.E−08 | C32 | 0.0000.E+00 |
| | C15 | −5.9313.E−09 | C33 | 0.0000.E+00 |
| | C16 | 6.5172.E−13 | C34 | 0.0000.E+00 |
| | C17 | −8.2391.E−12 | C35 | 0.0000.E+00 |
| | C18 | −9.6358.E−12 | C36 | 0.0000.E+00 |
| | C(Curvature) | | −1.2500.E−03 | |
| 4 | C1 | 0.0000.E+00 | C19 | 2.2823.E−12 |
| | C2 | 2.5200.E−01 | C20 | 2.6744.E−12 |
| | C3 | 2.1680.E+00 | C21 | 6.3122.E−12 |
| | C4 | 2.0630.E−04 | C22 | 1.0659.E−19 |
| | C5 | −1.2900.E−04 | C23 | −1.5171.E−20 |
| | C6 | −1.0510.E−03 | C24 | 1.3092.E−17 |
| | C7 | 1.1897.E−07 | C25 | −3.9844.E−20 |
| | C8 | 1.6224.E−07 | C26 | −4.0706.E−18 |
| | C9 | 8.6740.E−07 | C27 | −1.4365.E−20 |
| | C10 | 3.2392.E−06 | C28 | 3.5747.E−19 |
| | C11 | 1.0012.E−10 | C29 | 0.0000.E+00 |
| | C12 | 3.4292.E−11 | C30 | 0.0000.E+00 |
| | C13 | −8.9307.E−10 | C31 | 0.0000.E+00 |
| | C14 | −2.1255.E−09 | C32 | 0.0000.E+00 |
| | C15 | −5.8148.E−09 | C33 | 0.0000.E+00 |
| | C16 | 4.7836.E−14 | C34 | 0.0000.E+00 |
| | C17 | 2.2136.E−13 | C35 | 0.0000.E+00 |
| | C18 | 8.8278.E−14 | C36 | 0.0000.E+00 |

NUMERICAL EXAMPLE 4

A projection optical system according to Numerical Example 4 is an example of the projection optical system. Table 7 shows configuration data of the projection optical system according to Numerical Example 4, and Table 8 shows coefficients of polynomial free-form surfaces.

TABLE 7

| Surface | | Decentering Data | | | | | |
|---|---|---|---|---|---|---|---|
| | No. | | X | Y | Z | ADE | BDE | CDE |
| Display Surface | 1 | — | 0 | 0 | 0 | 0 | 0 | 0 |
| First Mirror M1 | 2 | Free-form Surface | 0 | 53.56004 | 105.11749 | 7.0243 | 14.1633 | 11.3841 |
| Second Mirror M2 | 3 | Free-form Surface | 71.35186 | 91.622 | −32.94119 | 13.5043 | 40.0973 | −0.2986 |
| Windshield | 4 | Free-form Surface | −285.0161 | 270.34986 | 213.63344 | 151.8246 | −53.5777 | −16.6064 |
| Viewer | 5 | — | −789.7367 | 67.09363 | 538.14601 | 151.8246 | −53.5777 | −16.6064 |

TABLE 8

| Surface No. | | Polynominal Coefficients | | |
|---|---|---|---|---|
| | C(Curvature) | | 7.0413.E−03 | |
| 2 | C1 | 0.0000.E+00 | C19 | 2.3156.E−10 |
| | C2 | 0.0000.E+00 | C20 | −1.7294.E−10 |
| | C3 | 0.0000.E+00 | C21 | 1.6286.E−10 |
| | C4 | −3.3383.E−03 | C22 | −3.1785.E−12 |
| | C5 | −1.4562.E−04 | C23 | 1.5755.E−12 |
| | C6 | −4.4202.E−03 | C24 | −1.0077.E−11 |
| | C7 | 2.7253.E−06 | C25 | 4.5798.E−12 |
| | C8 | −2.7393.E−06 | C26 | −3.2887.E−12 |
| | C9 | 5.5450.E−06 | C27 | 1.0512.E−11 |
| | C10 | 1.8657.E−07 | C28 | 2.3736.E−12 |
| | C11 | −5.1921.E−08 | C29 | 0.0000.E+00 |
| | C12 | −5.3235.E−09 | C30 | 0.0000.E+00 |
| | C13 | −9.7671.E−08 | C31 | 0.0000.E+00 |
| | C14 | −4.6358.E−08 | C32 | 0.0000.E+00 |
| | C15 | −8.2376.E−08 | C33 | 0.0000.E+00 |
| | C16 | 8.4957.E−11 | C34 | 0.0000.E+00 |
| | C17 | 6.6462.E−11 | C35 | 0.0000.E+00 |
| | C18 | 2.1547.E−11 | C36 | 0.0000.E+00 |
| | C(Curvature) | | −4.9064.E−03 | |
| 3 | C1 | 0.0000.E+00 | C19 | 3.8453.E−12 |
| | C2 | 0.0000.E+00 | C20 | 5.3066.E−14 |
| | C3 | 0.0000.E+00 | C21 | 1.0304.E−11 |
| | C4 | 3.3593.E−03 | C22 | 2.4614.E−13 |
| | C5 | −9.2749.E−06 | C23 | −1.1093.E−14 |
| | C6 | 2.7444.E−03 | C24 | 7.4827.E−13 |
| | C7 | 6.1370.E−07 | C25 | 3.1222.E−13 |
| | C8 | −6.9293.E−07 | C26 | 1.7458.E−12 |
| | C9 | 1.2612.E−06 | C27 | 1.9612.E−12 |
| | C10 | 3.5783.E−07 | C28 | 1.6927.E−12 |
| | C11 | 1.4613.E−08 | C29 | 0.0000.E+00 |
| | C12 | −1.8014.E−09 | C30 | 0.0000.E+00 |
| | C13 | 2.4364.E−08 | C31 | 0.0000.E+00 |
| | C14 | −1.2569.E−08 | C32 | 0.0000.E+00 |
| | C15 | 1.5862.E−09 | C33 | 0.0000.E+00 |
| | C16 | 3.2212.E−12 | C34 | 0.0000.E+00 |
| | C17 | −3.8182.E−12 | C35 | 0.0000.E+00 |
| | C18 | 3.9405.E−12 | C36 | 0.0000.E+00 |
| | C(Curvature) | | −1.2500.E−03 | |
| 4 | C1 | 0.0000.E+00 | C19 | 2.2823.E−12 |
| | C2 | 2.5200.E−01 | C20 | 2.6744.E−12 |
| | C3 | 2.1680.E+00 | C21 | 6.3122.E−12 |
| | C4 | 2.0630.E−04 | C22 | 1.0659.E−19 |
| | C5 | −1.2900.E−04 | C23 | −1.5171.E−20 |
| | C6 | −1.0510.E−03 | C24 | 1.3092.E−17 |
| | C7 | 1.1897.E−07 | C25 | −3.9844.E−20 |
| | C8 | 1.6224.E−07 | C26 | −4.0706.E−18 |
| | C9 | 8.6740.E−07 | C27 | −1.4365.E−20 |
| | C10 | 3.2392.E−06 | C28 | 3.5747.E−19 |
| | C11 | 1.0012.E−10 | C29 | 0.0000.E+00 |
| | C12 | 3.4292.E−11 | C30 | 0.0000.E+00 |
| | C13 | −8.9307.E−10 | C31 | 0.0000.E+00 |
| | C14 | −2.1255.E−09 | C32 | 0.0000.E+00 |
| | C15 | −5.8148.E−09 | C33 | 0.0000.E+00 |
| | C16 | 4.7836.E−14 | C34 | 0.0000.E+00 |
| | C17 | 2.2136.E−13 | C35 | 0.0000.E+00 |
| | C18 | 8.8278.E−14 | C36 | 0.0000.E+00 |

NUMERICAL EXAMPLE 5

A projection optical system according to Numerical Example 5 is an example of the projection optical system. Table 9 shows configuration data of the projection optical system according to Numerical Example 5, and Table 10 shows coefficients of polynomial free-form surfaces.

TABLE 9

| Surface | | | Decentering Data | | | | | |
|---|---|---|---|---|---|---|---|---|
| | No. | Shape | X | Y | Z | ADE | BDE | CDE |
| Display Surface | 1 | — | 0 | 0 | 0 | 0 | 0 | 0 |
| First Mirror M1 | 2 | Free-form Surface | 0 | 54.21598 | 106.40485 | 8.2741 | 10.8363 | 10.8588 |
| Second Mirror M2 | 3 | Free-form Surface | 59.73728 | 86.84569 | −50.24433 | 18.1765 | 33.0039 | −3.3083 |
| Windshield | 4 | Free-form Surface | −251.1295 | 315.17667 | 216.28817 | 165.6029 | −47.9784 | −7.2125 |
| Viewer | 5 | — | −719.0707 | 183.18048 | 622.45604 | 165.6029 | −47.9784 | −7.2125 |

TABLE 10

| Surface No. | | Polynominal Coefficients | | |
|---|---|---|---|---|
| | C(Curvature) | | 5.8882.E−03 | |
| 2 | C1 | 0.0000.E+00 | C19 | 2.7206.E−10 |
| | C2 | 0.0000.E+00 | C20 | 1.2607.E−10 |
| | C3 | 0.0000.E+00 | C21 | 1.8618.E−10 |
| | C4 | −2.9139.E−03 | C22 | −6.9445.E−13 |
| | C5 | −1.2337.E−04 | C23 | 7.8178.E−13 |
| | C6 | −3.9371.E−03 | C24 | −5.1730.E−12 |
| | C7 | 2.5639.E−06 | C25 | 2.8493.E−12 |
| | C8 | −1.7364.E−06 | C26 | −3.1188.E−12 |
| | C9 | 4.0768.E−06 | C27 | −3.5438.E−13 |
| | C10 | 1.9147.E−07 | C28 | −9.2636.E−13 |
| | C11 | −3.4708.E−08 | C29 | 0.0000.E+00 |
| | C12 | −9.6886.E−09 | C30 | 0.0000.E+00 |
| | C13 | −5.1864.E−08 | C31 | 0.0000.E+00 |
| | C14 | −4.0059.E−08 | C32 | 0.0000.E+00 |
| | C15 | −6.2284.E−08 | C33 | 0.0000.E+00 |
| | C16 | −2.0385.E−12 | C34 | 0.0000.E+00 |

TABLE 10-continued

| Surface No. | | Polynominal Coefficients | | |
|---|---|---|---|---|
| | C9 | 8.6740.E−07 | C27 | −1.4365.E−20 |
| | C10 | 3.2392.E−06 | C28 | 3.5747.E−19 |
| | C11 | 1.0012.E−10 | C29 | 0.0000.E+00 |
| | C12 | 3.4292.E−11 | C30 | 0.0000.E+00 |
| | C13 | −8.9307.E−10 | C31 | 0.0000.E+00 |
| | C14 | −2.1255.E−09 | C32 | 0.0000.E+00 |
| | C15 | −5.8148.E−09 | C33 | 0.0000.E+00 |
| | C16 | 4.7836.E−14 | C34 | 0.0000.E+00 |
| | C17 | 2.2136.E−13 | C35 | 0.0000.E+00 |
| | C18 | 8.8278.E−14 | C36 | 0.0000.E+00 |

NUMERICAL EXAMPLE 6

A projection optical system according to Numerical Example 6 is an example of the projection optical system. Table 11 shows configuration data of the projection optical system according to Numerical Example 6, and Table 12 shows coefficients of polynomial free-form surfaces.

TABLE 11

| Surface | | | Decentering Data | | | | | |
|---|---|---|---|---|---|---|---|---|
| | No. | Shape | X | Y | Z | ADE | BE | CDE |
| Display Surface | 1 | — | 0 | 0 | 0 | 0 | 0 | 0 |
| First Mirror M1 | 2 | Free-form Surface | −8.00256 | 30.51101 | 62.55685 | −14.9795 | 3.201 | 5.4354 |
| Second Mirror M2 | 3 | Free-form Surface | −13.59858 | 185.05359 | −43.03903 | −35.2189 | 10.658 | 0.8577 |
| Windshield | 4 | Free-form Surface | −184.1188 | −21.16861 | 340.00882 | 103.6494 | −18.2438 | −8.1377 |
| Viewer | 5 | — | −358.0015 | −582.9403 | 402.01564 | 103.6494 | −18.2438 | −8.1377 |

TABLE 10-continued

| Surface No. | | Polynominal Coefficients | | |
|---|---|---|---|---|
| | C17 | 3.8281.E−11 | C35 | 0.0000.E+00 |
| | C18 | −2.2752.E−11 | C36 | 0.0000.E+00 |
| | C(Curvature) | | −4.4178.E−03 | |
| 3 | C1 | 0.0000.E+00 | C19 | 1.5097.E−11 |
| | C2 | 0.0000.E+00 | C20 | 3.7256.E−11 |
| | C3 | 0.0000.E+00 | C21 | 3.3212.E−11 |
| | C4 | 3.0268.E−03 | C22 | 1.8512.E−13 |
| | C5 | 3.6892.E−05 | C23 | 1.4505.E−14 |
| | C6 | 2.3904.E−03 | C24 | 4.3211.E−13 |
| | C7 | 5.6521.E−07 | C25 | 1.0354.E−13 |
| | C8 | −6.0440.E−07 | C26 | 5.3348.E−13 |
| | C9 | 1.0422.E−06 | C27 | 2.7617.E−13 |
| | C10 | 5.3304.E−07 | C28 | 5.1294.E−13 |
| | C11 | 9.9109.E−09 | C29 | 0.0000.E+00 |
| | C12 | −1.7909.E−09 | C30 | 0.0000.E+00 |
| | C13 | 1.8398.E−08 | C31 | 0.0000.E+00 |
| | C14 | −9.7256.E−09 | C32 | 0.0000.E+00 |
| | C15 | −2.2079.E−09 | C33 | 0.0000.E+00 |
| | C16 | 9.8224.E−13 | C34 | 0.0000.E+00 |
| | C17 | −4.9839.E−12 | C35 | 0.0000.E+00 |
| | C18 | −2.8406.E−12 | C36 | 0.0000.E+00 |
| | C(Curvature) | | −1.2500.E−03 | |
| 4 | C1 | 0.0000.E+00 | C19 | 2.2823.E−12 |
| | C2 | 2.5200.E−01 | C20 | 2.6744.E−12 |
| | C3 | 2.1680.E+00 | C21 | 6.3122.E−12 |
| | C4 | 2.0630.E−04 | C22 | 1.0659.E−19 |
| | C5 | −1.2900.E−04 | C23 | −1.5171.E−20 |
| | C6 | −1.0510.E−03 | C24 | 1.3092.E−17 |
| | C7 | 1.1897.E−07 | C25 | −3.9844.E−20 |
| | C8 | 1.6224.E−07 | C26 | −4.0706.E−18 |

TABLE 12

| Surface No. | | Polynominal Coefficients | | |
|---|---|---|---|---|
| | C(Curvature) | | 6.0519.E−03 | |
| 2 | C1 | 0.0000.E+00 | C19 | 5.7040.E−10 |
| | C2 | 0.0000.E+00 | C20 | −4.5183.E−10 |
| | C3 | 0.0000.E+00 | C21 | 3.1691.E−10 |
| | C4 | −4.3998.E−03 | C22 | 1.7362.E−12 |
| | C5 | 8.1833.E−04 | C23 | 2.0414.E−12 |
| | C6 | −3.8507.E−03 | C24 | −5.8426.E−12 |
| | C7 | 4.0152.E−06 | C25 | −2.3894.E−12 |
| | C8 | 1.0820.E−05 | C26 | −3.4383.E−12 |
| | C9 | −9.3157.E−07 | C27 | 1.1165.E−11 |
| | C10 | 4.0863.E−06 | C28 | 6.8873.E−12 |
| | C11 | −8.7880.E−08 | C29 | 0.0000.E+00 |
| | C12 | −3.6166.E−08 | C30 | 0.0000.E+00 |
| | C13 | −1.0294.E−07 | C31 | 0.0000.E+00 |
| | C14 | −2.7895.E−08 | C32 | 0.0000.E+00 |
| | C15 | −1.1387.E−07 | C33 | 0.0000.E+00 |
| | C16 | 1.4416.E−11 | C34 | 0.0000.E+00 |
| | C17 | 2.8778.E−10 | C35 | 0.0000.E+00 |
| | C18 | 2.0600.E−10 | C36 | 0.0000.E+00 |
| | C(Curvature) | | −4.0179.E−03 | |
| 3 | C1 | 0.0000.E+00 | C19 | 2.7200.E−11 |
| | C2 | 0.0000.E+00 | C20 | −1.6032.E−11 |
| | C3 | 0.0000.E+00 | C21 | 1.8729.E−12 |
| | C4 | 2.5594.E−03 | C22 | 1.2268.E−13 |
| | C5 | 2.6329.E−04 | C23 | 1.3117.E−14 |
| | C6 | 2.5888.E−03 | C24 | 2.3638.E−13 |
| | C7 | 7.0440.E−07 | C25 | −1.4919.E−13 |
| | C8 | 2.8156.E−07 | C26 | 1.0886.E−13 |
| | C9 | 3.4573.E−07 | C27 | −9.3411.E−14 |
| | C10 | 4.2303.E−08 | C28 | 2.3753.E−13 |
| | C11 | 5.6956.E−09 | C29 | 0.0000.E+00 |

TABLE 12-continued

| Surface No. | | Polynominal Coefficients | | |
|---|---|---|---|---|
| | C12 | −1.6715.E−09 | C30 | 0.0000.E+00 |
| | C13 | 1.7025.E−08 | C31 | 0.0000.E+00 |
| | C14 | 4.8169.E−10 | C32 | 0.0000.E+00 |
| | C15 | 1.9059.E−09 | C33 | 0.0000.E+00 |
| | C16 | 4.1741.E−12 | C34 | 0.0000.E+00 |
| | C17 | 1.3633.E−11 | C35 | 0.0000.E+00 |
| | C18 | 2.0834.E−12 | C36 | 0.0000.E+00 |
| | C(Curvature) | | −1.6667.E−03 | |
| 4 | C1 | 0.0000.E+00 | C19 | −2.9219.E−12 |
| | C2 | 1.9163.E−01 | C20 | −2.8957.E−12 |
| | C3 | 1.7665.E+00 | C21 | 3.3087.E−12 |
| | C4 | 2.9400.E−04 | C22 | 7.2017.E−20 |
| | C5 | −1.0300.E−05 | C23 | −4.6235.E−20 |
| | C6 | −4.5000.E−05 | C24 | 7.1019.E−19 |
| | C7 | 6.4980.E−07 | C25 | 2.4711.E−20 |
| | C8 | −1.3521.E−07 | C26 | 1.0288.E−18 |
| | C9 | 1.0596.E−06 | C27 | 2.1742.E−22 |
| | C10 | 2.5316.E−06 | C28 | 1.4469.E−19 |
| | C11 | 3.6921.E−11 | C29 | 0.0000.E+00 |
| | C12 | −6.5830.E−07 | C30 | 0.0000.E+00 |
| | C13 | 2.1945.E−09 | C31 | 0.0000.E+00 |
| | C14 | −6.2075.E−10 | C32 | 0.0000.E+00 |
| | C15 | −4.0460.E−09 | C33 | 0.0000.E+00 |
| | C16 | 1.6148.E−13 | C34 | 0.0000.E+00 |
| | C17 | 1.9107.E−12 | C35 | 0.0000.E+00 |
| | C18 | −6.8477.E−13 | C36 | 0.0000.E+00 |

NUMERICAL EXAMPLE 7

A projection optical system according to Numerical Example 7 is an example of the projection optical system. Table 13 shows configuration data of the projection optical system according to Numerical Example 7, and Table 14 shows coefficients of polynomial free-form surfaces.

TABLE 13

| Surface | | | Decentering Data | | | | |
|---|---|---|---|---|---|---|---|
| | No. | Shape | X | Y | Z | ADE | BDE | CDE |
| Display Surace | 1 | — | 0 | 0 | 0 | 0 | 0 | 0 |
| First Mirror M1 | 2 | Free-form Surface | −0.84846 | 65.24565 | 139.91976 | 4.2283 | 6.1623 | −6.9844 |
| Second Mirror M2 | 3 | Free-form Surface | 43.68609 | 130.88626 | −75.24498 | 8.4339 | 23.9815 | −4.4362 |
| Windshield | 4 | Free-form Surface | −250.5201 | 280.91231 | 321.00749 | 147.9766 | −34.5722 | −11.5761 |
| Viewer | 5 | — | −553.3365 | −46.66637 | 673.1521 | 147.9766 | −34.5722 | −11.5761 |

TABLE 14

| Surface No. | | Polynominal Coefficients | | |
|---|---|---|---|---|
| | C(Curvature) | | 4.6465.E−03 | |
| 2 | C1 | 0.0000.E+00 | C19 | 6.2281.E−11 |
| | C2 | 0.0000.E+00 | C20 | −4.8766.E−11 |
| | C3 | 0.0000.E+00 | C21 | 5.9090.E−11 |
| | C4 | −3.0026.E−03 | C22 | −1.5036.E−13 |
| | C5 | 1.8617.E−04 | C23 | 1.2922.E−13 |
| | C6 | −3.2005.E−03 | C24 | −8.5096.E−13 |
| | C7 | 9.2020.E−07 | C25 | 2.7102.E−14 |
| | C8 | −2.5739.E−07 | C26 | −8.1797.E−13 |
| | C9 | −1.6862.E−07 | C27 | −3.1615.E−13 |
| | C10 | 5.9600.E−07 | C28 | 1.1343.E−13 |
| | C11 | −1.6085.E−08 | C29 | 0.0000.E+00 |
| | C12 | −1.9633.E−09 | C30 | 0.0000.E+00 |
| | C13 | −3.0901.E−08 | C31 | 0.0000.E+00 |
| | C14 | 9.4780.E−09 | C32 | 0.0000.E+00 |
| | C15 | −2.3152.E−08 | C33 | 0.0000.E+00 |
| | C16 | −2.2901.E−12 | C34 | 0.0000.E+00 |
| | C17 | 1.0445.E−11 | C35 | 0.0000.E+00 |
| | C18 | −2.6483.E−11 | C36 | 0.0000.E+00 |
| | C(Curvature) | | −3.6252.E−03 | |
| 3 | C1 | 0.0000.E+00 | C019 | −7.4272.E−13 |
| | C2 | 0.0000.E+00 | C20 | −2.5328.E−12 |
| | C3 | 0.0000.E+00 | C21 | 1.3814.E−11 |
| | C4 | 2.2537.E−03 | C22 | 5.7188.E−14 |
| | C5 | 8.7894.E−05 | C23 | −8.5717.E−15 |
| | C6 | 2.0161.E−03 | C24 | 1.3086.E−13 |
| | C7 | 2.0695.E−07 | C25 | −1.1984.E−14 |
| | C8 | −4.6514.E−07 | C26 | 1.3304.E−13 |
| | C9 | −1.8600.E−07 | C27 | 6.4389.E−14 |
| | C10 | 1.8228.E−08 | C28 | 3.7202.E−13 |
| | C11 | 5.0374.E−09 | C29 | 0.0000.E+00 |
| | C12 | −5.4105.E−10 | C30 | 0.0000.E+00 |
| | C13 | 1.0657.E−08 | C31 | 0.0000.E+00 |
| | C14 | 4.4575.E−10 | C32 | 0.0000.E+00 |
| | C15 | 1.4475.E−09 | C33 | 0.0000.E+00 |
| | C16 | −3.6081.E−14 | C34 | 0.0000.E+00 |
| | C17 | −3.5760.E−12 | C35 | 0.0000.E+00 |
| | C18 | −1.4890.E−12 | C36 | 0.0000.E+00 |
| | C(Curvature) | | −3.3333.E−04 | |
| 4 | C1 | 0.0000.E+00 | C19 | 1.3720.E−12 |
| | C2 | 2.2225.E−01 | C20 | 4.2612.E−12 |
| | C3 | 1.8883.E+00 | C21 | 8.7031.E−12 |
| | C4 | −9.4467.E−05 | C22 | 0.0000.E+00 |
| | C5 | 8.6740.E−05 | C23 | 0.0000.E+00 |
| | C6 | −9.2344.E−04 | C24 | 0.0000.E+00 |
| | C7 | 7.8286.E−08 | C25 | 0.0000.E+00 |
| | C8 | −3.1529.E−08 | C26 | 0.0000.E+00 |
| | C9 | −1.0555.E−07 | C27 | 0.0000.E+00 |
| | C10 | 2.9948.E−06 | C28 | 0.0000.E+00 |
| | C11 | −1.9233.E−10 | C29 | 0.0000.E+00 |
| | C12 | −3.0412.E−10 | C30 | 0.0000.E+00 |
| | C13 | −1.4961.E−10 | C31 | 0.0000.E+00 |
| | C14 | −1.9998.E−09 | C32 | 0.0000.E+00 |
| | C15 | −7.3727.E−09 | C33 | 0.0000.E+00 |
| | C16 | 3.1255.E−13 | C34 | 0.0000.E+00 |
| | C17 | 6.9153.E−13 | C35 | 0.0000.E+00 |
| | C18 | 9.1833.E−13 | C36 | 0.0000.E+00 |

NUMERICAL EXAMPLE 8

A projection optical system according to Numerical Example 8 is an example of the projection optical system. Table 15 shows configuration data of the projection optical system according to Numerical Example 8, and Table 16 shows coefficients of polynomial free-form surfaces.

TABLE 15

| Surface | | | Decentering Data | | | | | |
|---|---|---|---|---|---|---|---|---|
| | No. | Shape | X | Y | Z | ADE | BDE | CDE |
| Display Surface | 1 | — | 0 | 0 | 0 | 0 | 0 | 0 |
| First Mirror M1 | 2 | Free-form Surface | −2.2294 | 64.7979 | 138.95954 | 2.0455 | 4.3324 | −4.3583 |
| Second Mirror M2 | 3 | Free-form Surface | 36.36611 | 175.65853 | −148.3968 | 2.4236 | 21.2256 | −0.8995 |
| Windshield | 4 | Free-form Surface | −245.8065 | 270.33032 | 272.89419 | 141.7842 | −30.5611 | −12.8879 |
| Viewer | 5 | — | −513.0569 | −106.0099 | 604.49134 | 141.7842 | −30.5611 | −12.8879 |

TABLE 16

| Surface No. | Polynominal Coefficients | | | |
|---|---|---|---|---|
| | C(Curvature) | | 4.4056.E−03 | |
| 2 | C1 | 0.0000.E+00 | C19 | 3.3213.E−11 |
| | C2 | 0.0000.E+00 | C20 | −7.3725.E−12 |
| | C3 | 0.0000.E+00 | C21 | 2.4870.E−11 |
| | C4 | −3.0703.E−03 | C22 | −1.2660.E−13 |
| | C5 | 7.3069.E−05 | C23 | 2.9801.E−14 |
| | C6 | −3.1794.E−03 | C24 | −6.1704.E−13 |
| | C7 | 6.6017.E−07 | C25 | 2.0867.E−15 |
| | C8 | 1.6658.E−07 | C26 | −3.7215.E−13 |
| | C9 | −4.5519.E−07 | C27 | −7.1670.E−13 |
| | C10 | 1.1330.E−06 | C28 | 3.2033.E−13 |
| | C11 | −1.3656.E−08 | C29 | 0.0000.E+00 |
| | C12 | −7.1459.E−10 | C30 | 0.0000.E+00 |
| | C13 | −2.7001.E−08 | C31 | 0.0000.E+00 |
| | C14 | 6.9992.E−09 | C32 | 0.0000.E+00 |
| | C15 | −1.9435.E−08 | C33 | 0.0000.E+00 |
| | C16 | −6.6114.E−13 | C34 | 0.0000.E+00 |
| | C17 | 8.5186.E−12 | C35 | 0.0000.E+00 |
| | C18 | −1.1990.E−11 | C36 | 0.0000.E+00 |
| | C(Curvature) | | −3.6409.E−03 | |
| 3 | C1 | 0.0000.E+00 | C19 | −1.4442.E−12 |
| | C2 | 0.0000.E+00 | C20 | −1.1791.E−15 |
| | C3 | 0.0000.E+00 | C21 | 8.0341.E−12 |
| | C4 | 2.1554.E−03 | C22 | 5.7821.E−14 |
| | C5 | 4.2745.E−05 | C23 | −1.1555.E−14 |
| | C6 | 1.9646.E−03 | C24 | 1.6027.E−13 |
| | C7 | 1.1263.E−07 | C25 | −1.3462.E−14 |
| | C8 | −3.7935.E−07 | C26 | 1.2459.E−13 |
| | C9 | −2.1187.E−07 | C27 | 2.7812.E−15 |
| | C10 | 1.5061.E−07 | C28 | 3.5634.E−13 |
| | C11 | 5.2027.E−09 | C29 | 0.0000.E+00 |
| | C12 | −3.5834.E−10 | C30 | 0.0000.E+00 |
| | C13 | 1.0816.E−08 | C31 | 0.0000.E+00 |
| | C14 | 2.5500.E−10 | C32 | 0.0000.E+00 |
| | C15 | 2.6142.E−09 | C33 | 0.0000.E+00 |
| | C16 | 1.0915.E−15 | C34 | 0.0000.E+00 |
| | C17 | −2.6559.E−12 | C35 | 0.0000.E+00 |
| | C18 | −1.0932.E−12 | C36 | 0.0000.E+00 |
| | C(Curvature) | | −3.3333.E−04 | |
| 4 | C1 | 0.0000.E+00 | C19 | 1.3720.E−12 |
| | C2 | 2.2225.E−01 | C20 | 4.2612.E−12 |
| | C3 | 1.8883.E+00 | C21 | 8.7031.E−12 |
| | C4 | −9.4467.E−05 | C22 | 0.0000.E+00 |
| | C5 | 8.6740.E−05 | C23 | 0.0000.E+00 |
| | C6 | −9.2344.E−04 | C24 | 0.0000.E+00 |
| | C7 | 7.8286.E−08 | C25 | 0.0000.E+00 |
| | C8 | −3.1529.E−08 | C26 | 0.0000.E+00 |
| | C9 | −1.0555.E−07 | C27 | 0.0000.E+00 |
| | C10 | 2.9948.E−06 | C28 | 0.0000.E+00 |
| | C11 | −1.9233.E−10 | C29 | 0.0000.E+00 |
| | C12 | −3.0412.E−10 | C30 | 0.0000.E+00 |
| | C13 | −1.4961.E−10 | C31 | 0.0000.E+00 |
| | C14 | −1.9998.E−09 | C32 | 0.0000.E+00 |
| | C15 | −7.3727.E−09 | C33 | 0.0000.E+00 |
| | C16 | 3.1255.E−13 | C34 | 0.0000.E+00 |
| | C17 | 6.9153.E−13 | C35 | 0.0000.E+00 |
| | C18 | 9.1833.E−13 | C36 | 0.0000.E+00 |

SUMMARY OF NUMERICAL EXAMPLES

Table 17 shows examples of the image display size, the virtual image size, virtual image distance V which is the distance from the center of the viewing region of the viewer to the center of the virtual image, and the eye box size (EBx and EBy). Table 18 shows values of conditions (1) to (7).

Conditions (6) and (7) are satisfied in all the regions of each optical element, namely, windshield 22, first mirror M1, and second mirror M2, rather than being satisfied only when, in each optical element, the approximately rectangular regions each having, as opposite angles, one of four corners and a point at 80% of a line segment from the center of the optical element to the one of the four corners are located near the four corners.

TABLE 17

| | | Num. Example1 | Num. Example2 | Num. Example3 | Num. Example4 | Num. Example5 | Num. Example6 | Num. Example7 | Num. Example8 |
|---|---|---|---|---|---|---|---|---|---|
| Display Size | X | 38.36 | 38.52 | 38.35 | 38.72 | 43.28 | 64.92 | 61.94 | 65.9494 |
| | Y | 17.62 | 18.43 | 38.35 | 14.91 | 17.34 | 34.23 | 22.57 | 23.8592 |
| Virtual Image Size (deg) | X | 6.5 | 6.5 | 6.5 | 6.5 | 6.5 | 10.0 | 10.0 | 10.0 |
| | Y | 2.5 | 2.5 | 2.5 | 2.5 | 2.5 | 1.0 | 3.0 | 3.0 |
| Pupil-Virtual ImageDistace(V) | | 2200 | 2200 | 7000 | 20000 | 7000 | 2800 | 7000 | 10000 |
| Eye Box Size (EBx or EBy) | X | 130 | 130 | 130 | 130 | 130 | 130 | 130 | 130 |
| | Y | 40 | 40 | 40 | 40 | 10 | 40 | 40 | 40 |

TABLE 18

| | Num. Example1 | Num. Example2 | Num. Example3 | Num. Example4 | Num. Example5 | Num. Example6 | Num. Example7 | Num. Example8 |
|---|---|---|---|---|---|---|---|---|
| EBx/Rxmax | 0.159 | 0.098 | 0.096 | 0.096 | 0.095 | 0.181 | 0.061 | 0.060 |
| EBy/Rymax | 0.010 | 0.007 | 0.007 | 0.007 | 0.007 | 0.007 | 0.004 | 0.004 |
| $\|\theta_{zmax}-\theta_{zmin}\|$(deg) | 2.75 | 3.18 | 2.41 | 2.52 | 2.41 | 1.51 | 1.36 | 1.39 |
| LM/LD | 1.7 | 1.6 | 1.4 | 1.4 | 1.4 | 2.7 | 1.5 | 2.0 |
| (LD + LM)/V | 0.07 | 0.08 | 0.01 | 0.01 | 0.04 | 0.09 | 0.05 | 0.05 |
| (RxWS/RxM2 + RxM2/RxM1)max | 3.7 | 36.1 | 6.9 | 5.7 | 2.7 | 47.6 | 6.7 | 10.3 |
| (RxWS/RxM2 + RxM2/RxM1)min | 1.9 | 3.2 | 2.2 | 2.2 | 2.1 | 2.8 | 3.1 | 4.0 |
| (RyWS/RyM2 + RyM2/RyM1)max | 24.8 | -9.7 | 32.5 | 85.4 | 17.0 | 17.9 | 17.9 | 73.9 |
| (RyWS/RyM2 + RyM2/RyM1)min | -12.6 | -16.6 | -19.3 | 6.0 | -17.3 | 10.9 | 7.6 | 9.1 |

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The head-up display according to the present disclosure is suitable for vehicles.

What is claimed is:

1. A head-up display which projects an image on a windshield and forms a virtual image visually recognizable by a viewer, the head-up display comprising:
   a display element which displays the image; and
   a projection optical system which guides the image displayed by the display element to the windshield and forms the virtual image, wherein
   the projection optical system includes at least two mirrors each having a reflective surface with a concave profile, and
   the windshield has a curvature radius Rx in a right-left direction of the windshield which satisfies:

$$0.05 < EBx/Rxmax < 0.50 \quad (1)$$

where EBx denotes an eye box size in an X direction in which the virtual image is visually recognizable by the viewer, and
   Rxmax denotes a maximum value of the curvature radius Rx in an effective ray area of the windshield,
   given that an X axis is the right-left direction viewed from the viewer.

2. The head-up display according to claim 1, wherein the head-up display satisfies:

$$0.5 < LM/LD < 8.0 \quad (4)$$

where LM denotes a distance between a first mirror and a second mirror in a central optical path L of the projection optical system from the display element to the windshield, and
   LD denotes a distance from the display element to the first mirror in the central optical path L of the projection optical system from the display element to the windshield,
   given that the first mirror is one of the at least two mirrors which is located closest to the display element in an optical path from the display element to the windshield, and the second mirror is another one of the at least two mirrors which is located closest to the windshield in the optical path from the display element to the windshield.

3. The head-up display according to claim 1, wherein the head-up display satisfies:

$$0.0 < (LD+LM)/V < 0.2 \quad (5)$$

where LM denotes a distance between a first mirror and a second mirror in a central optical path of the projection optical system from the display element to the windshield,
   LD denotes a distance from the display element to the first mirror in the central optical path of the projection optical system from the display element to the windshield, and
   V denotes a distance, along the central optical path, from a center of a viewing region of the viewer to a center of the virtual image,
   given that the first mirror is one of the at least two mirrors which is located closest to the display element in an optical path from the display element to the windshield, and the second mirror is another one of the at least two mirrors which is located closest to the windshield in the optical path from the display element to the windshield.

4. The head-up display according to claim 1, wherein the head-up display satisfies:

$$1 < RxWS/RxM2 + RxM2/RxM1 < 70 \qquad (6)$$

where RxM1 denotes a curvature radius of a first mirror in a direction parallel to a longer side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror, where RxM2 denotes a curvature radius of a second mirror in a direction parallel to a longer side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and RxWS denotes a curvature radius of the windshield in a horizontal direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image, given that:

the first mirror is one of the at least two mirrors which is located closest to the display element in an optical path from the display element to the windshield, and the second mirror is another one of the at least two mirrors which is located closest to the windshield in the optical path from the display element to the windshield; and each of the windshield, the first mirror, and the second mirror has a positive curvature radius when having a reflective surface with a concave profile, and has a negative curvature radius when having a reflective surface with a convex profile.

5. The head-up display according to claim 1, wherein the head-up display satisfies:

$$-50 < RyWS/RyM2 + RyM2/RyM1 < 100 \qquad (7)$$

where RyM1 denotes a curvature radius of a first mirror in a direction parallel to a shorter side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror, RyM2 denotes a curvature radius of a second mirror in a direction parallel to a shorter side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and RyWS denotes a curvature radius of the windshield in a vertical direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image, given that:

the first mirror is one of the at least two mirrors which is located closest to the display element in an optical path from the display element to the windshield, and the second mirror is another one of the at least two mirrors which is located closest to the windshield in the optical path from the display element to the windshield; and each of the windshield, the first mirror, and the second mirror has a positive curvature radius when having a reflective surface with a concave profile, and has a negative curvature radius when having a reflective surface with a convex profile.

6. The head-up display according to claim 2, wherein the first mirror is rotationally asymmetric and has a reflective surface with a concave profile.

7. The head-up display according to claim 3, wherein the first mirror is rotationally asymmetric and has a reflective surface with a concave profile.

8. The head-up display according to claim 2, wherein the second mirror is rotationally asymmetric and has a reflective surface with a concave profile.

9. The head-up display according to claim 3, wherein the second mirror is rotationally asymmetric and has a reflective surface with a concave profile.

10. A head-up display which projects an image on a windshield and forms a virtual image visually recognizable by a viewer, the head-up display comprising:

a display element which displays the image; and a projection optical system which guides the image displayed by the display element to the windshield and forms the virtual image, wherein the projection optical system includes at least two mirrors each having a reflective surface with a concave profile, and the windshield has a curvature radius Ry in a perpendicular direction of the windshield which satisfies:

$$0.05 < EBy/Ry\max < 0.50 \qquad (2)$$

where EBy denotes an eye box size in a Y direction in which the virtual image is visually recognizable by the viewer, and Rymax denotes a maximum value of the curvature radius Ry in an effective ray area of the windshield, given that a Y axis is an up-down direction viewed from the viewer.

11. The head-up display according to claim 10, wherein the head-up display satisfies:

$$0.5 < LM/LD < 8.0 \qquad (4)$$

where LM denotes a distance between a first mirror and a second mirror in a central optical path L of the projection optical system from the display element to the windshield, and LD denotes a distance from the display element to the first mirror in the central optical path L of the projection optical system from the display element to the windshield, given that the first mirror is one of the at least two mirrors which is located closest to the display element in an optical path from the display element to the windshield, and the second mirror is another one of the at least two mirrors which is located closest to the windshield in the optical path from the display element to the windshield.

12. The head-up display according to claim 10, wherein the head-up display satisfies:

$$0.0 < (LD/LM)/V < 0.2 \quad (5)$$

where LM denotes a distance between a first mirror and a second mirror in a central optical path of the projection optical system from the display element to the windshield, LD denotes a distance from the display element to the first mirror in the central optical path of the projection optical system from the display element to the windshield, and V denotes a distance, along the central optical path, from a center of a viewing region of the viewer to a center of the virtual image, given that the first mirror is one of the at least two mirrors which is located closest to the display element in an optical path from the display element to the windshield, and the second mirror is another one of the at least two mirrors which is located closest to the windshield in the optical path from the display element to the windshield.

13. The head-up display according to claim 10, wherein the head-up display satisfies:

$$1 < RxWS/RxM2 + RxM2/RxM1 < 70 \quad (6)$$

where RxM1 denotes a curvature radius of a first mirror in a direction parallel to a longer side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror, where RxM2 denotes a curvature radius of a second mirror in a direction parallel to a longer side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and RxWS denotes a curvature radius of the windshield in a horizontal direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image, given that:

the first mirror is one of the at least two mirrors which is located closest to the display element in an optical path from the display element to the windshield, and the second mirror is another one of the at least two mirrors which is located closest to the windshield in the optical path from the display element to the windshield; and each of the windshield, the first mirror, and the second mirror has a positive curvature radius when having a reflective surface with a concave profile, and has a negative curvature radius when having a reflective surface with a convex profile.

14. The head-up display according to claim 10, wherein the head-up display satisfies:

$$-50 < RyWS/RyM2 + RyM2/RyM1 < 100 \quad (7)$$

where RyM1 denotes a curvature radius of a first mirror in a direction parallel to a shorter side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror, RyM2 denotes a curvature radius of a second mirror in a direction parallel to a shorter side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and RyWS denotes a curvature radius of the windshield in a vertical direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image, given that:

the first mirror is one of the at least two mirrors which is located closest to the display element in an optical path from the display element to the windshield, and the second mirror is another one of the at least two mirrors which is located closest to the windshield in the optical path from the display element to the windshield; and each of the windshield, the first mirror, and the second mirror has a positive curvature radius when having a reflective surface with a concave profile, and has a negative curvature radius when having a reflective surface with a convex profile.

15. A head-up display which projects an image on a windshield and forms a virtual image visually recognizable by a viewer, the head-up display comprising:

a display element which displays the image; and a projection optical system which guides the image displayed by the display element to the windshield and forms the virtual image, wherein the projection optical system includes at least two mirrors each having a reflective surface with a concave profile, and the windshield satisfies:

$$1.0° < |\theta zmax - \theta zmin| < 6.0° \quad (3)$$

where θz denotes an angle formed by a normal vector orthogonal to a tangent plane passing through an origin of a definition expression which defines a shape of the windshield and a normal vector to a tangent plane at a given point on the windshield,
θzmax denotes a maximum value of θz, and
θzmin denotes a minimum value of θz.

16. The head-up display according to claim 15, wherein the head-up display satisfies:

$$0.5 < LM/LD < 8.0 \quad (4)$$

where LM denotes a distance between a first mirror and a second mirror in a central optical path L of the projection optical system from the display element to the windshield, and
LD denotes a distance from the display element to the first mirror in the central optical path L of the projection optical system from the display element to the windshield,
given that the first mirror is one of the at least two mirrors which is located closest to the display element in an optical path from the display element to the windshield, and the second mirror is another one of the at least two mirrors which is located closest to the windshield in the optical path from the display element to the windshield.

17. The head-up display according to claim 15, wherein the head-up display satisfies:

$$0.0 < (LD+LM)/V < 0.2 \quad (5)$$

where LM denotes a distance between a first mirror and a second mirror in a central optical path of the projection optical system from the display element to the windshield,
LD denotes a distance from the display element to the first mirror in the central optical path of the projection optical system from the display element to the windshield, and
V denotes a distance, along the central optical path, from a center of a viewing region of the viewer to a center of the virtual image,
given that the first mirror is one of the at least two mirrors which is located closest to the display element in an optical path from the display element to the windshield, and the second mirror is another one of the at least two mirrors which is located closest to the windshield in the optical path from the display element to the windshield.

18. The head-up display according to claim 15, wherein the head-up display satisfies:

$$1 < RxWS/RxM2 + RxM2/RxM1 < 70 \quad (6)$$

where RxM1 denotes a curvature radius of a first mirror in a direction parallel to a longer side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror,
where RxM2 denotes a curvature radius of a second mirror in a direction parallel to a longer side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and
RxWS denotes a curvature radius of the windshield in a horizontal direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image,
given that:
the first mirror is one of the at least two mirrors which is located closest to the display element in an optical path from the display element to the windshield, and the second mirror is another one of the at least two mirrors which is located closest to the windshield in the optical path from the display element to the windshield; and
each of the windshield, the first mirror, and the second mirror has a positive curvature radius when having a reflective surface with a concave profile, and has a negative curvature radius when having a reflective surface with a convex profile.

19. The head-up display according to claim 15, wherein the head-up display satisfies:

$$-50 < RyWS/RyM2 + RyM2/RyM1 < 100 \quad (7)$$

where RyM1 denotes a curvature radius of a first mirror in a direction parallel to a shorter side of the first mirror at at least one of reflection points of a ray of light passing through first regions that are approximately rectangular regions each having, as a diagonal, a line segment connecting one of four corners of the first mirror and a point at 80%, from an approximate center of the first mirror, of a line segment extending from the approximate center of the first mirror to the one of the four corners of the first mirror,
RyM2 denotes a curvature radius of a second mirror in a direction parallel to a shorter side of the second mirror at at least one of reflection points of a ray of light passing through second regions that are approximately rectangular regions each having, as a diagonal, a line segment connecting one of four corners of the second mirror and a point at 80%, from an approximate center of the second mirror, of a line segment extending from the approximate center of the second mirror to the one of the four corners of the second mirror, and
RyWS denotes a curvature radius of the windshield in a vertical direction at at least one of reflection points of a ray of light passing through third regions that are approximately rectangular regions each having, as a diagonal, a line segment connecting one of four corners of the image projected on the windshield and a point at 80%, from an approximate center of the image, of a line segment extending from the approximate center of the image to the one of the four corners of the image,
given that:
the first mirror is one of the at least two mirrors which is located closest to the display element in an optical path from the display element to the windshield, and the second mirror is another one of the at least two mirrors which is located closest to the windshield in the optical path from the display element to the windshield; and each of the windshield, the first mirror, and the second mirror has a positive curvature radius when having a reflective surface with a concave profile, and has a negative curvature radius when having a reflective surface with a convex profile.

* * * * *